United States Patent
Terao et al.

(10) Patent No.: US 8,098,397 B2
(45) Date of Patent: Jan. 17, 2012

(54) IMAGE FORMING APPARATUS AND PRINTING METHOD HAVING PRINTING TYPE CHANGING PART

(75) Inventors: Masato Terao, Tokyo (JP); Masafumi Yamagami, Tokyo (JP); Tomoyuki Tsukuba, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 12/770,298

(22) Filed: Apr. 29, 2010

(65) Prior Publication Data

US 2010/0271662 A1    Oct. 28, 2010

Related U.S. Application Data

(62) Division of application No. 10/667,381, filed on Sep. 23, 2003, now Pat. No. 7,738,134.

(30) Foreign Application Priority Data

Sep. 24, 2002  (JP) ................................. 2002-276675
Sep. 24, 2002  (JP) ................................. 2002-276677
Aug. 26, 2003  (JP) ................................. 2003-301779

(51) Int. Cl.
  *G06K 15/00*  (2006.01)
  *G06F 3/12*  (2006.01)

(52) U.S. Cl. ..................................... 358/1.18; 358/1.13

(58) Field of Classification Search .................. 358/1.1, 358/1.7, 1.8, 1.12, 1.13, 1.14, 1.15, 1.18; 271/3.08, 3.09, 3.17, 9.04; 355/23, 24, 25, 355/26, 46, 82, 84; 399/388, 389, 391
See application file for complete search history.

(56) References Cited

U.S. PATENT DOCUMENTS

| | | | | |
|---|---|---|---|---|
| 5,797,080 A * | 8/1998 | Okamoto | ....................... | 399/391 |
| 5,839,019 A | 11/1998 | Ito | ................... | 399/45 |
| 5,875,035 A * | 2/1999 | Motosugi et al. | ............ | 358/296 |
| 6,285,458 B1 * | 9/2001 | Yada | ............................ | 358/1.15 |
| 6,943,921 B2 | 9/2005 | Nakata et al. | ................ | 358/401 |
| 2003/0043410 A1 * | 3/2003 | Fukawa et al. | ................ | 358/2.1 |

FOREIGN PATENT DOCUMENTS

| | | |
|---|---|---|
| JP | 2000-224369 | 8/2000 |
| JP | 2001-350368 | 12/2001 |
| JP | 2002-223336 | 8/2002 |
| JP | 2002-232677 | 8/2002 |
| JP | 2002-240399 | 8/2002 |

* cited by examiner

*Primary Examiner* — Gabriel Garcia

(74) *Attorney, Agent, or Firm* — Oblon, Spivak, McClelland, Maier & Neustadt, L.L.P.

(57) ABSTRACT

In an image forming apparatus which includes a hardware resource used for image forming processing and a program for performing processing concerning image formation, a type of reading an original during a plurality of originals which include different types of originals in a mixed manner being read, and printing paper sheets on which images have been formed based on the plurality of originals are grouped.

19 Claims, 35 Drawing Sheets

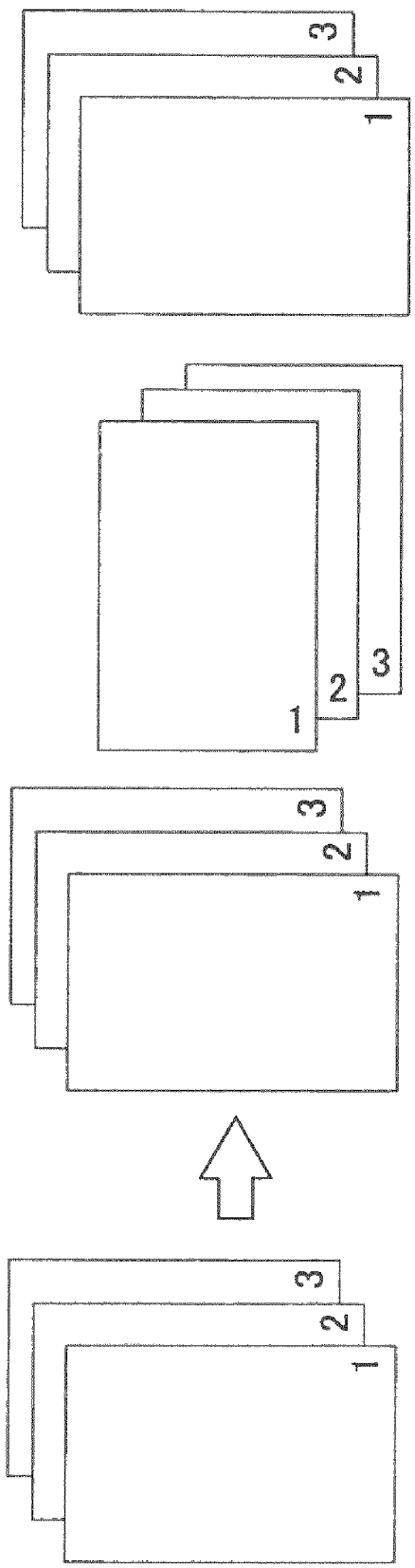

FIG.7A 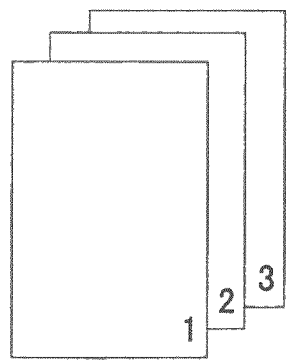  FIG.7B 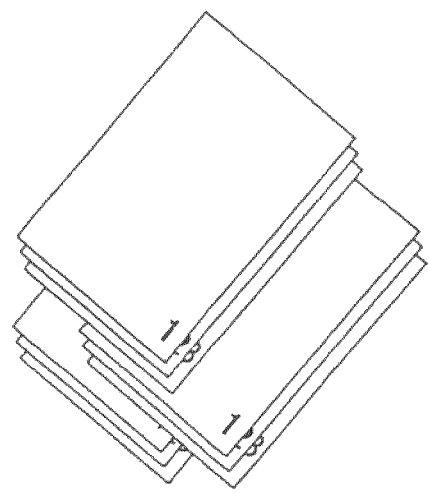

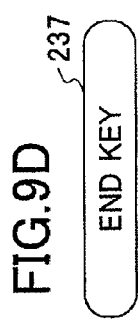
FIG.9D  END KEY
FIG.9E  ORIGINAL READING MODE CHANGE KEY
FIG.9F  PRINTING MODE CHANGE KEY
FIG.9G  ORIGINAL SEPARATION KEY

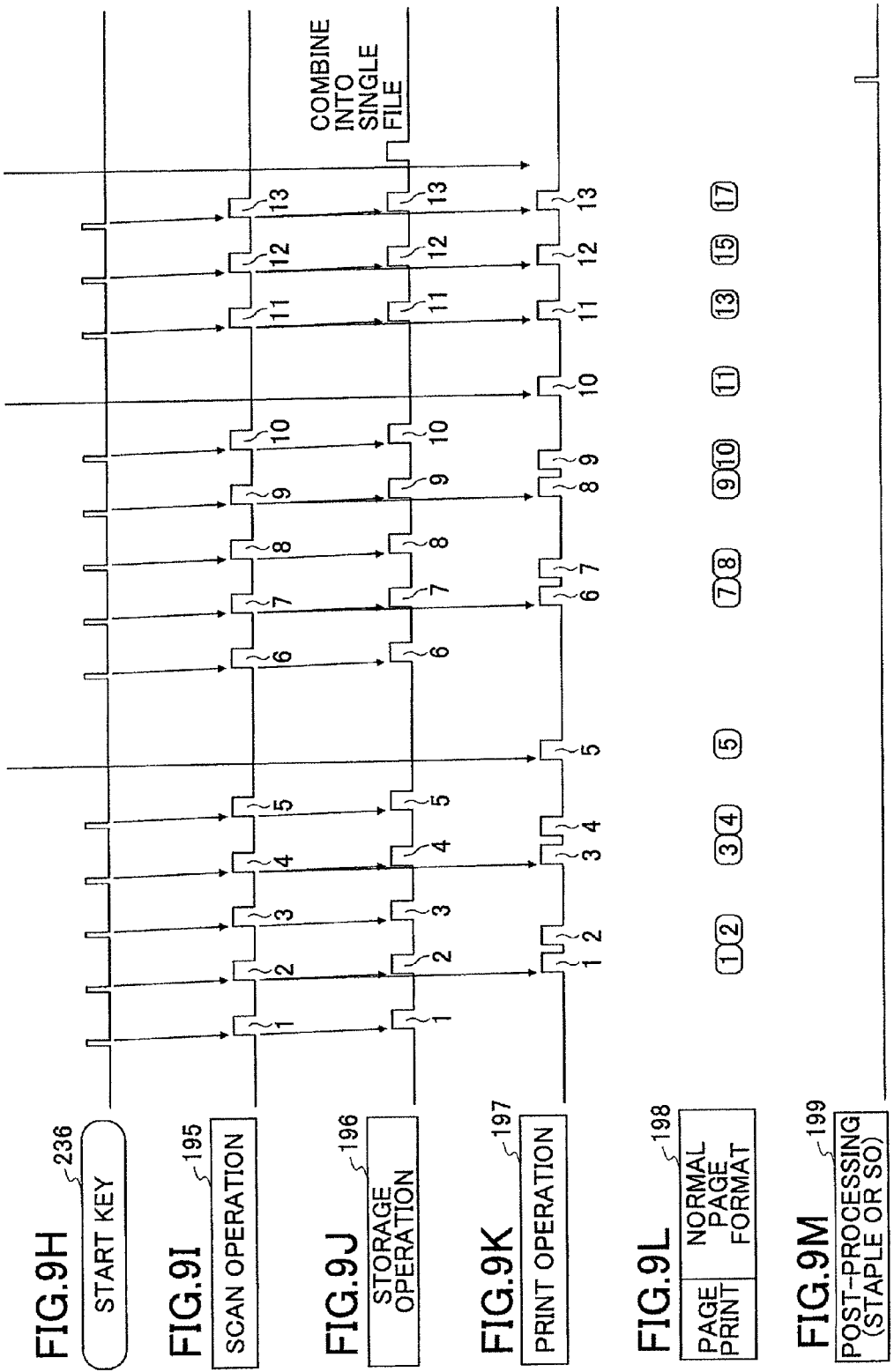

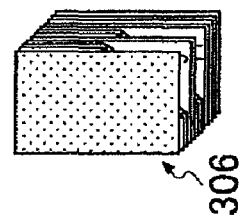
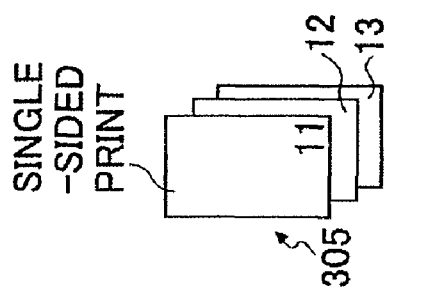
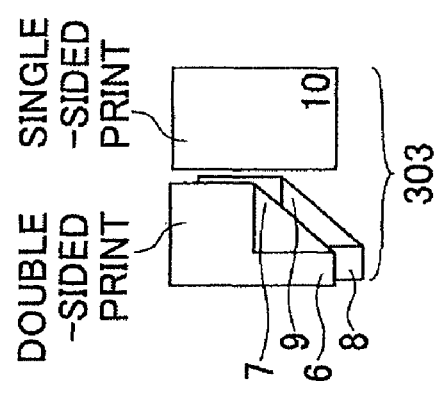
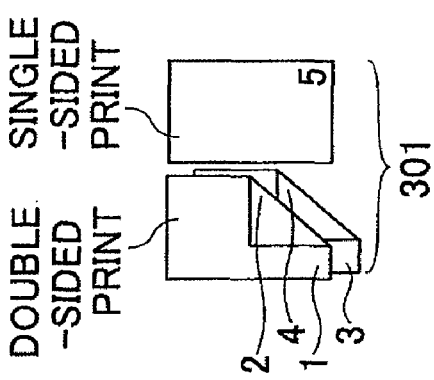

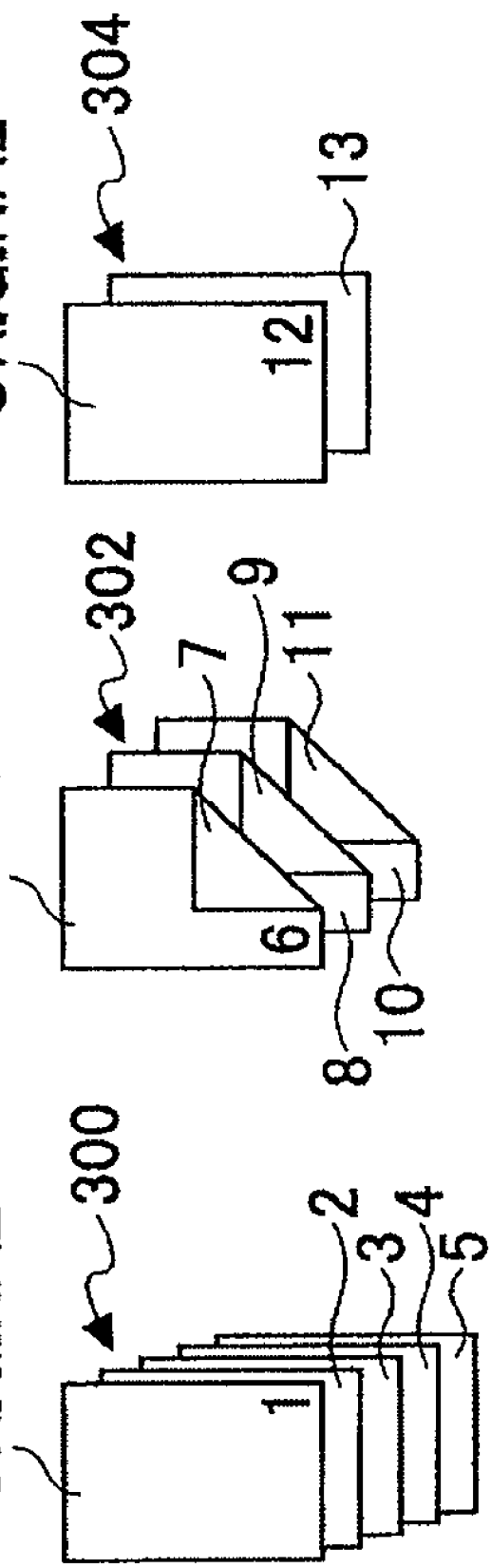

FIG.10D 237 END KEY

FIG.10E 191 ORIGINAL READING MODE CHANGE KEY

FIG.10F 192 PRINTING MODE CHANGE KEY

FIG.10G 220 ORIGINAL SEPARATION KEY

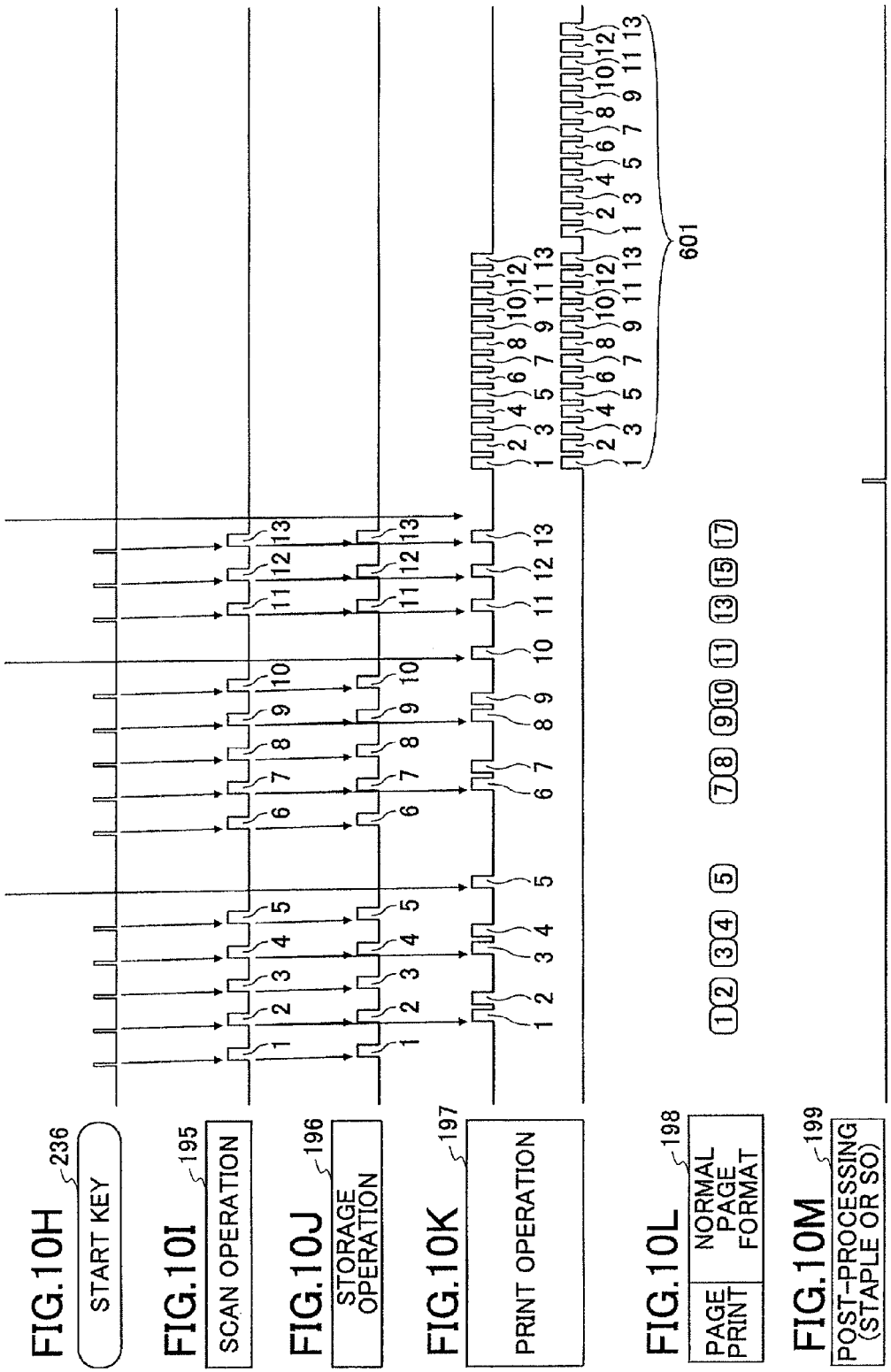

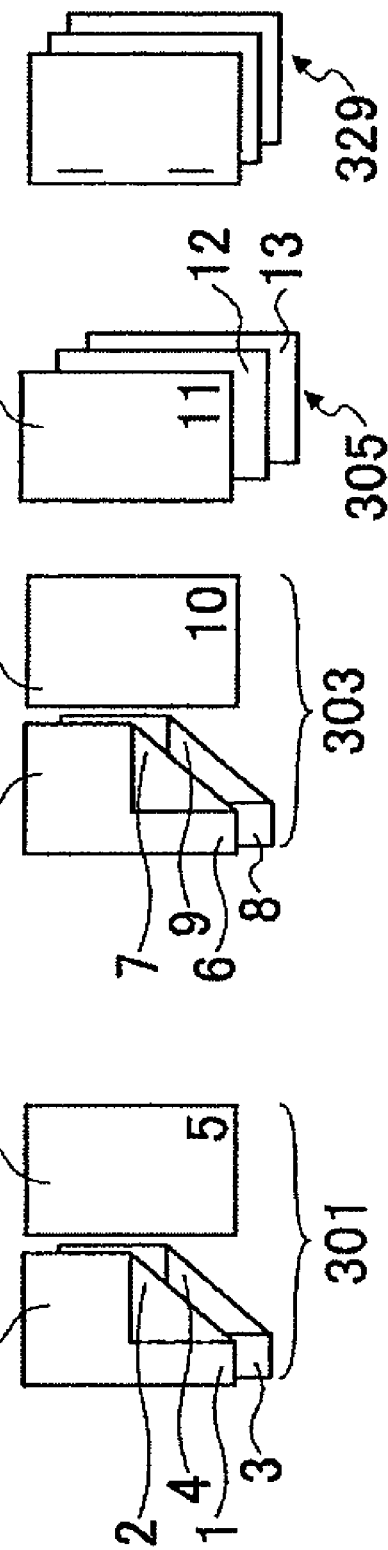

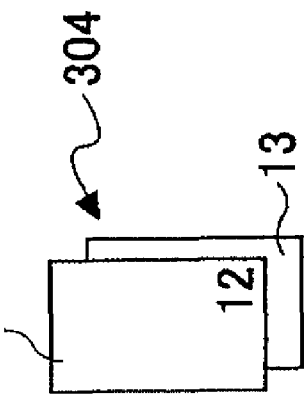
FIG.12C SINGLE-SIDED ORIGINAL
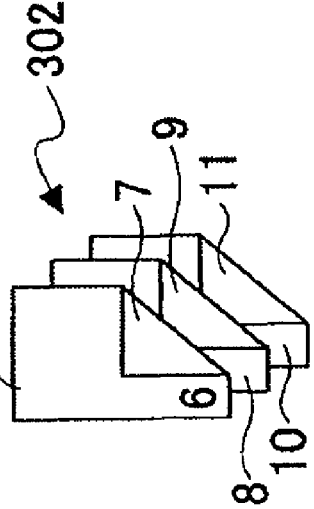
FIG.12B DOUBLE-SIDED ORIGINAL
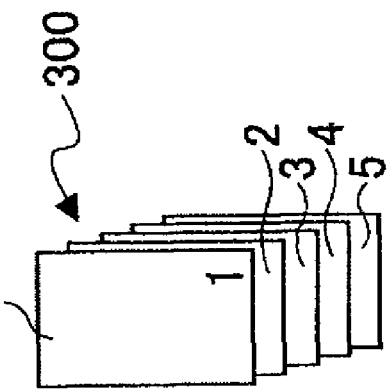
FIG.12A SINGLE-SIDED ORIGINAL

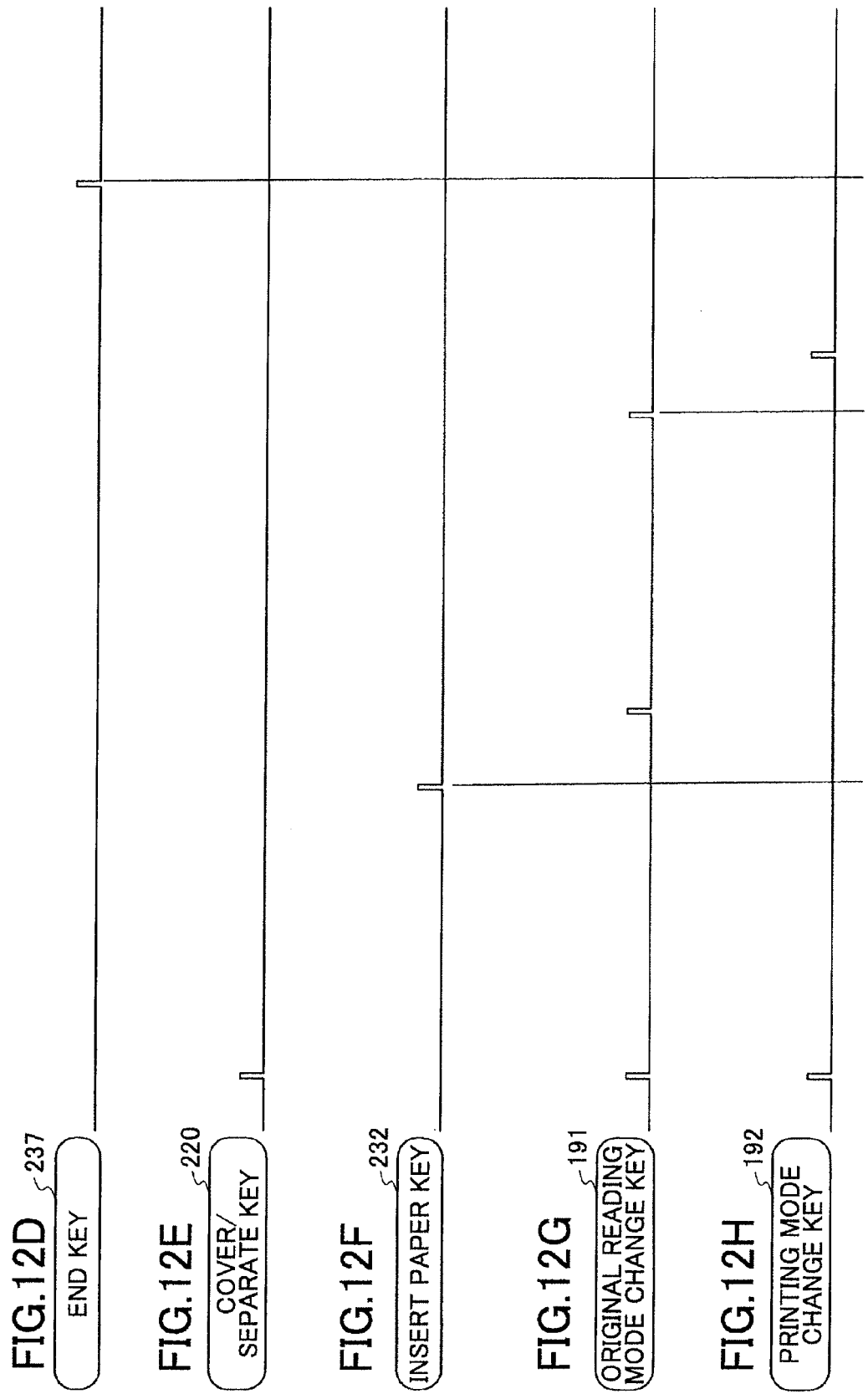

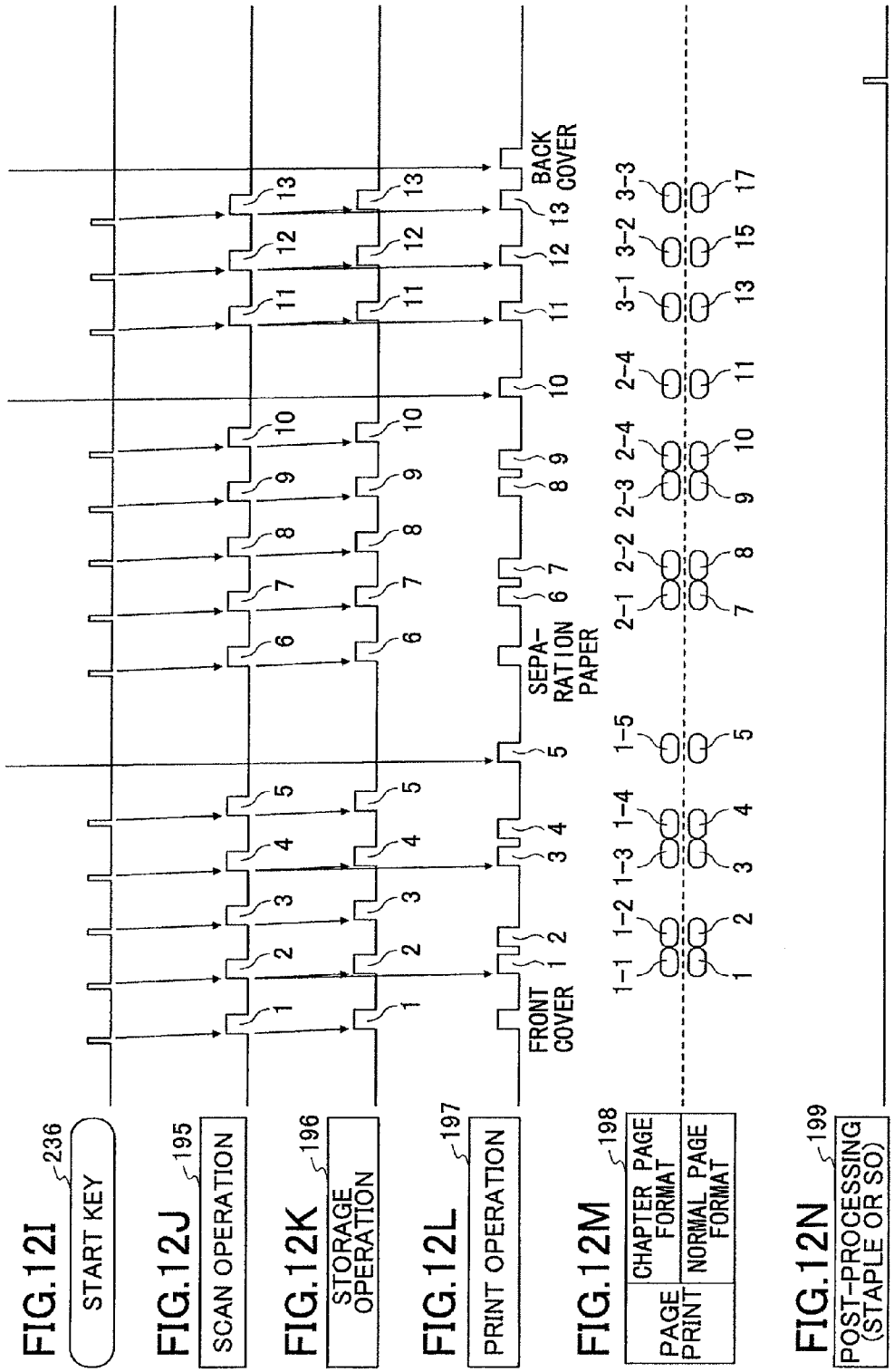

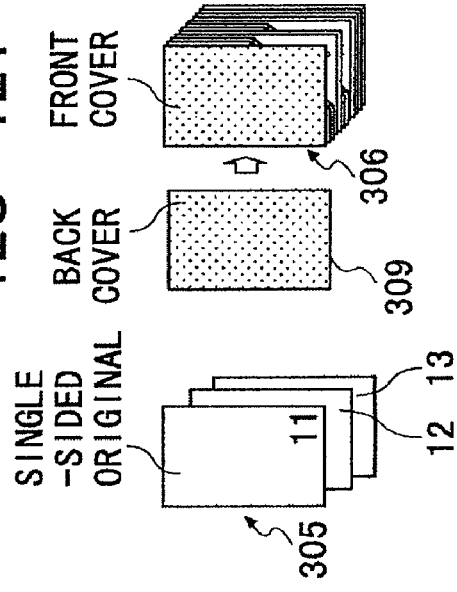
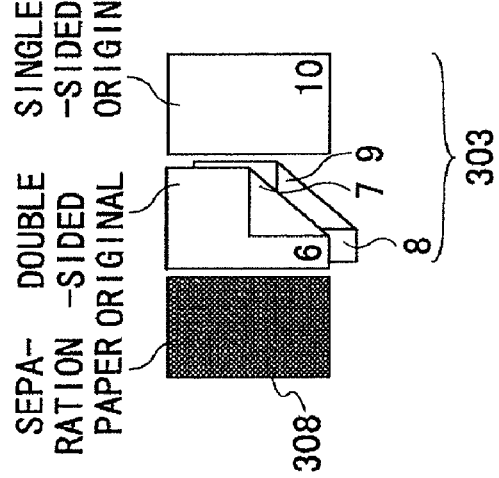
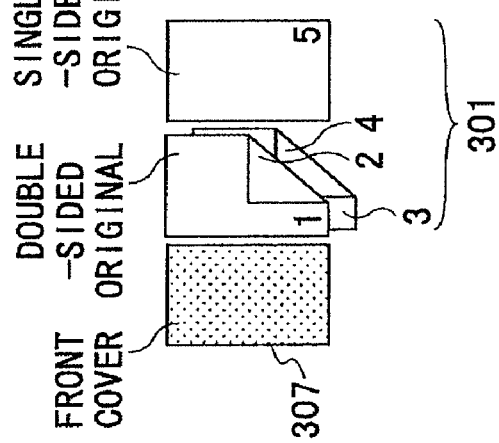

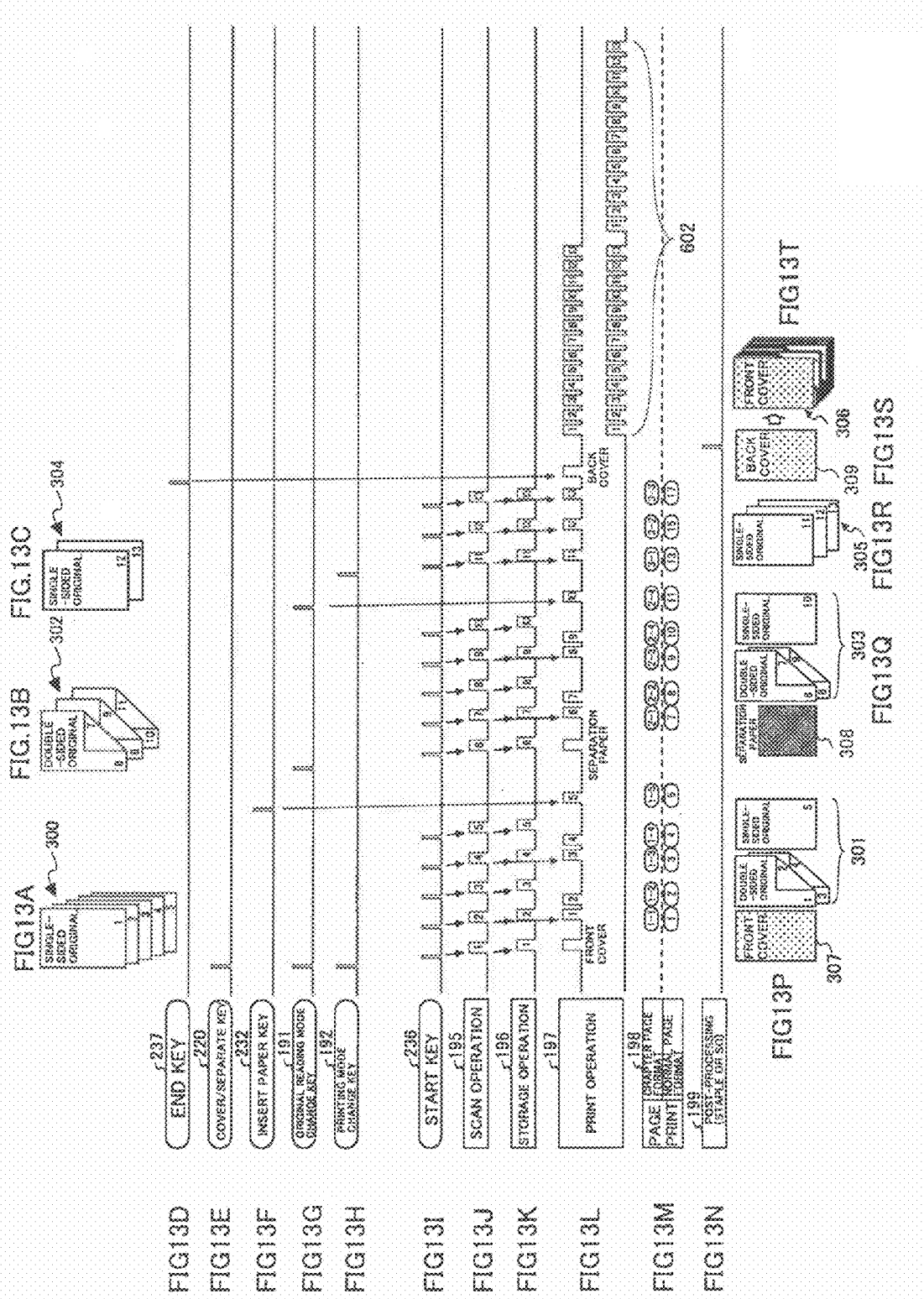

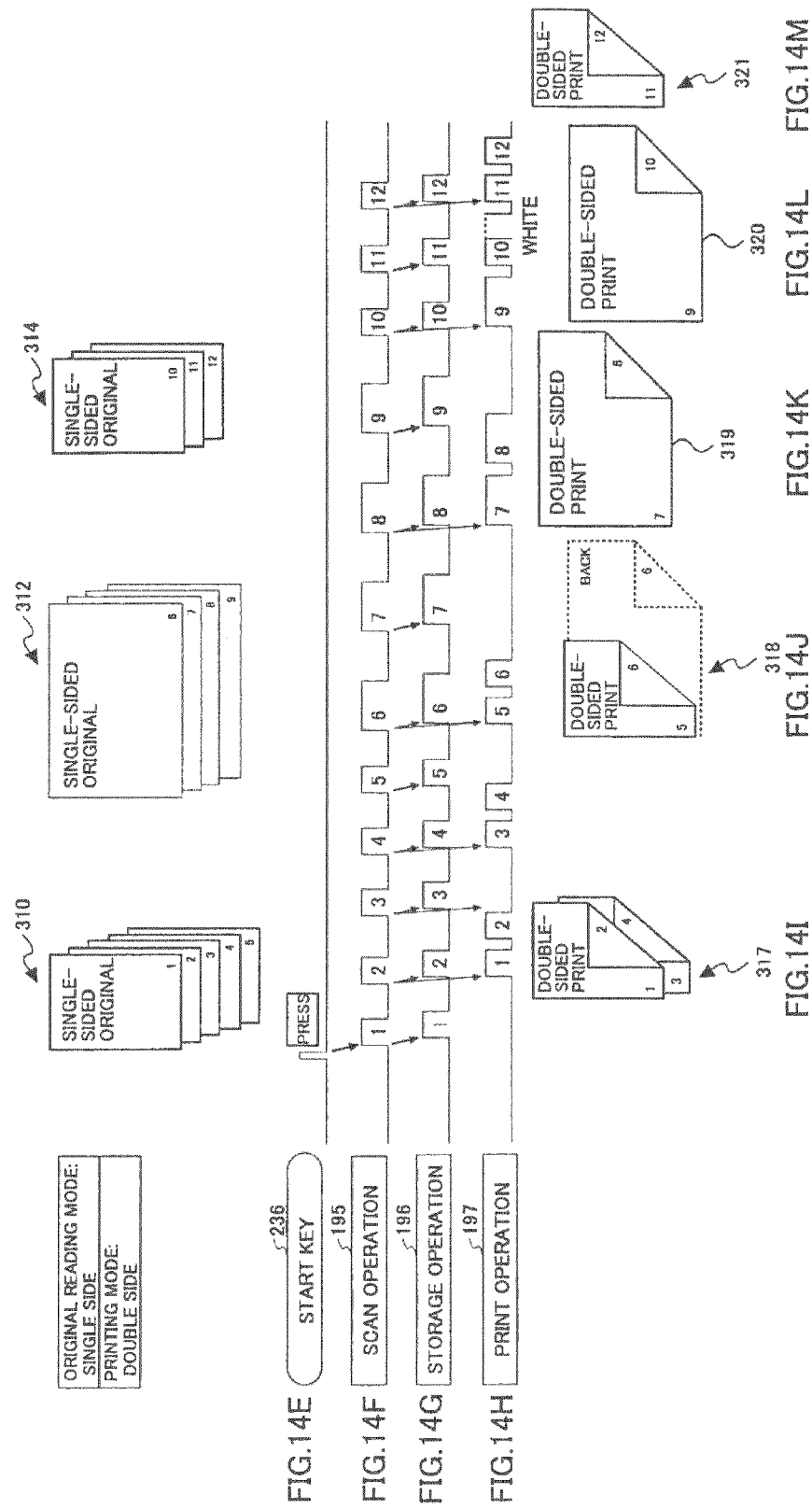

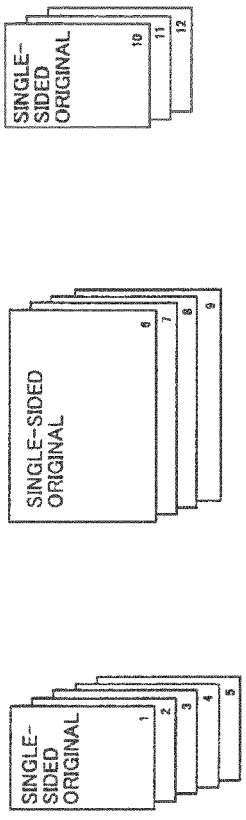

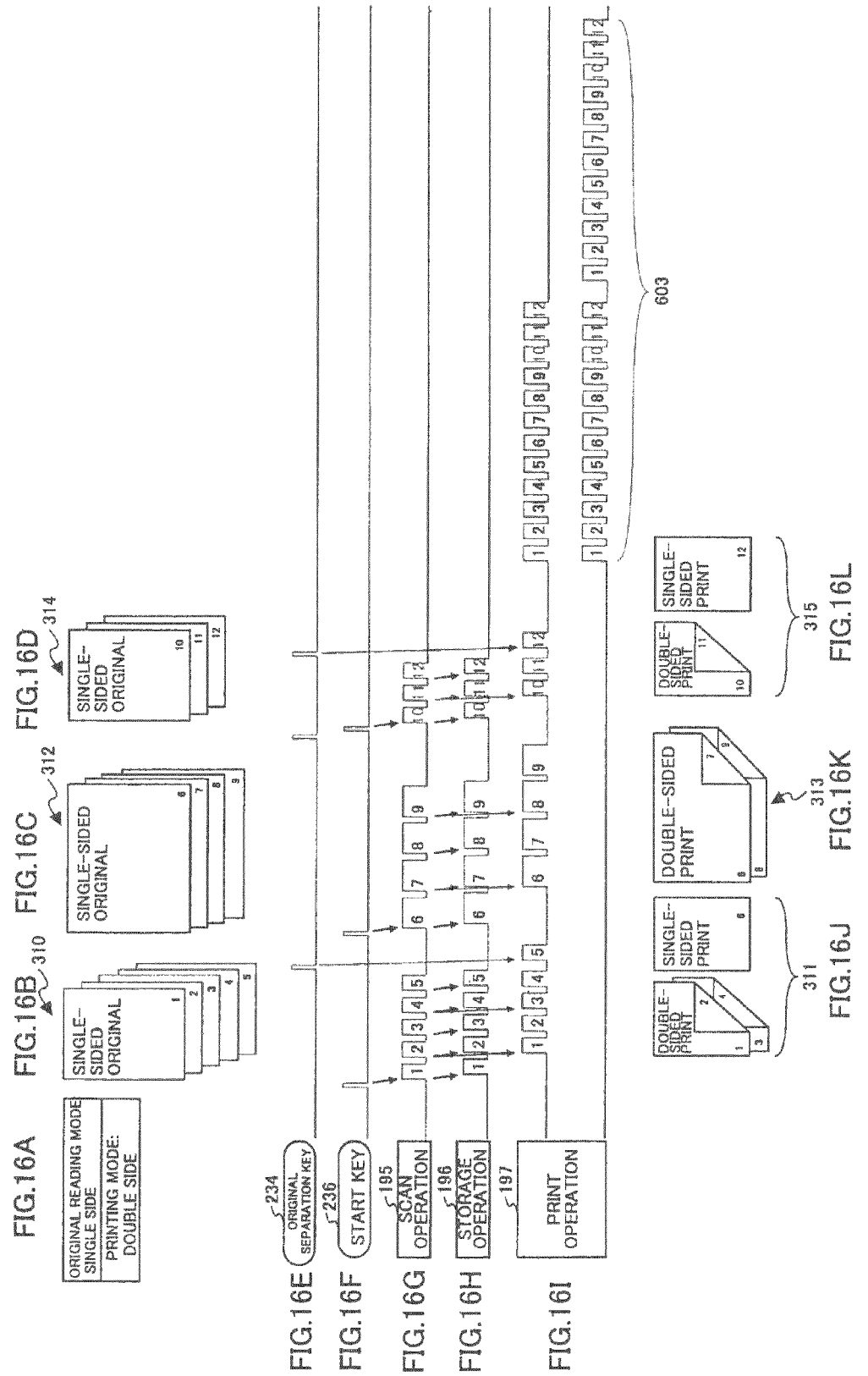

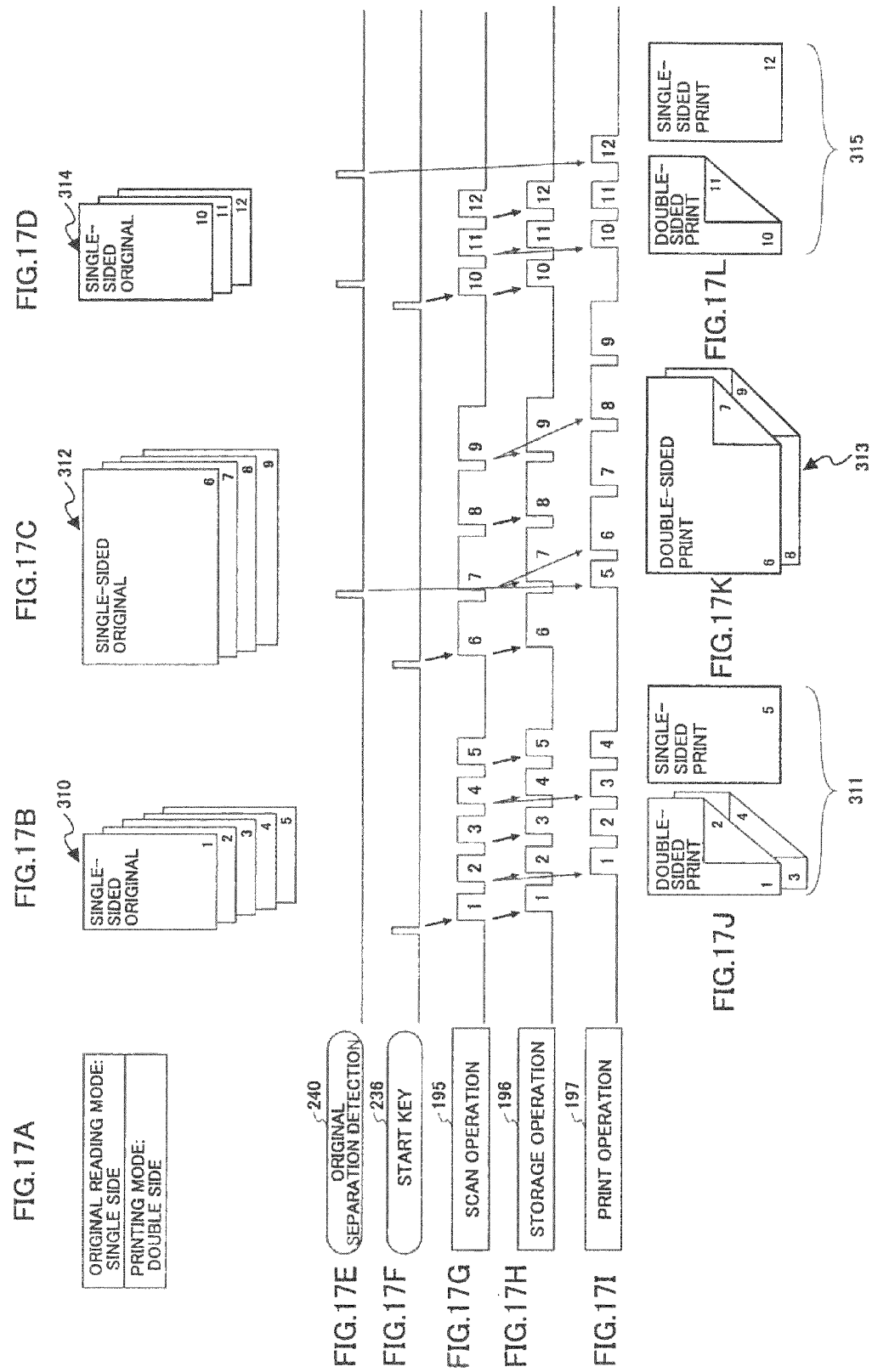

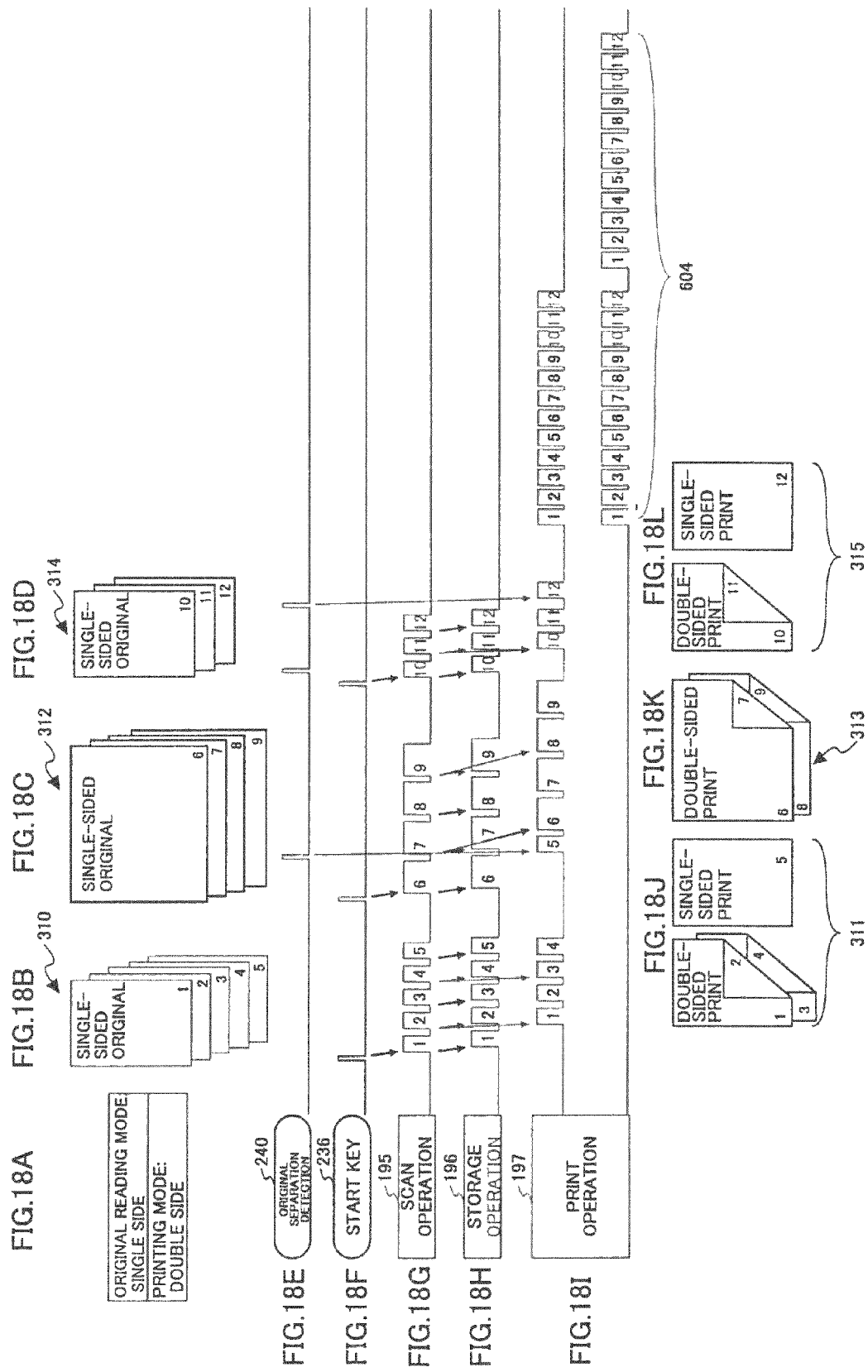

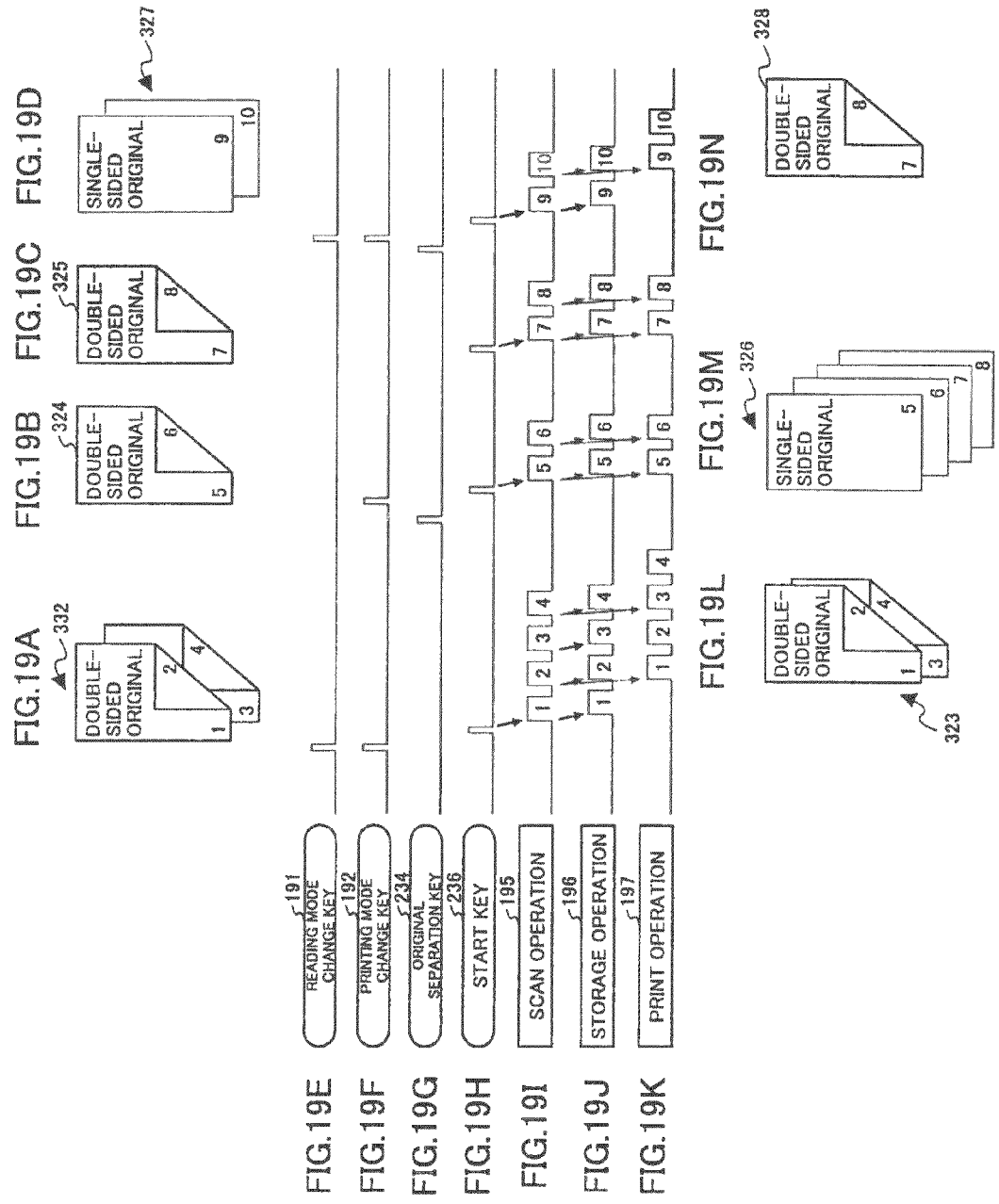

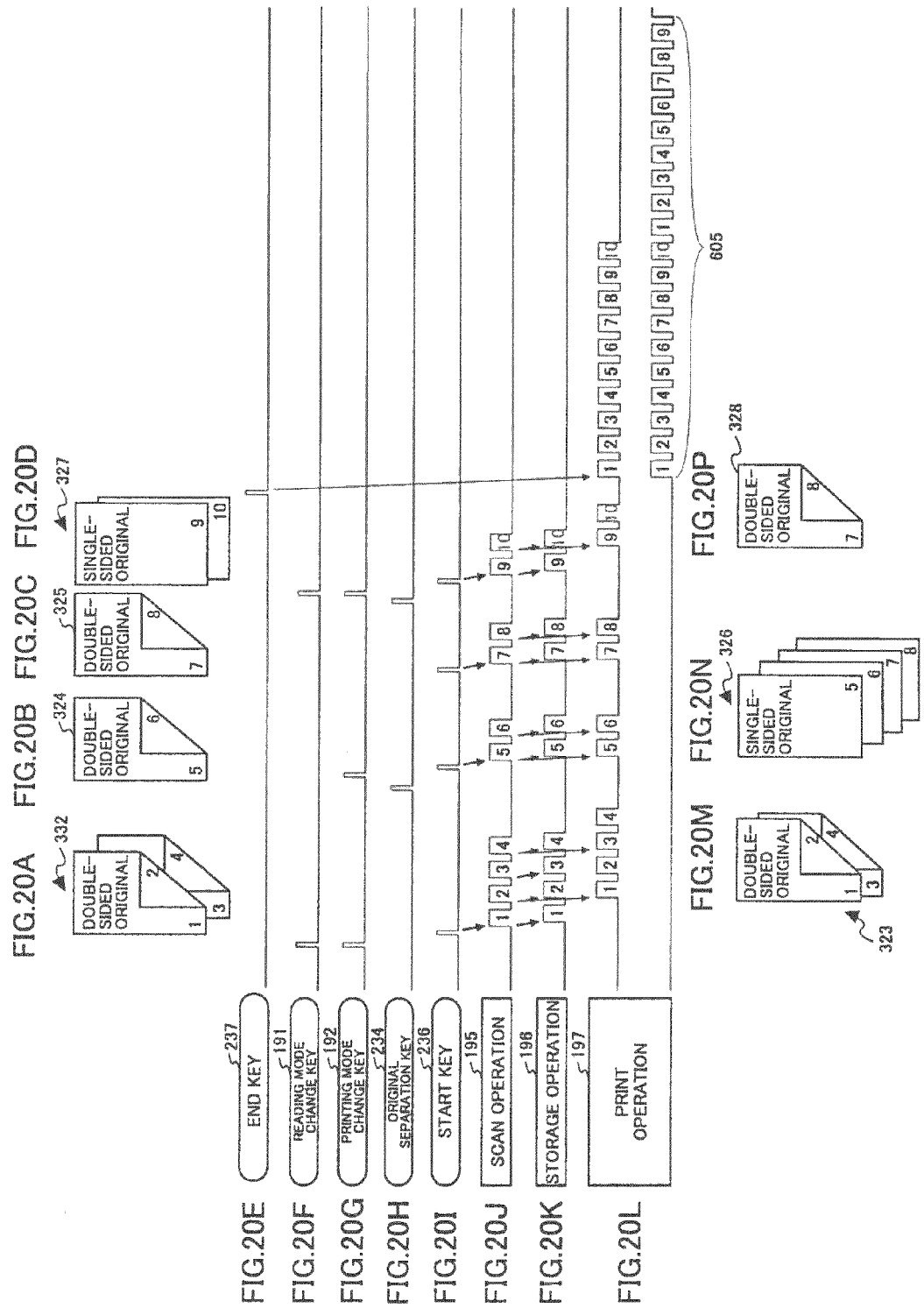

IMAGE FORMING APPARATUS AND PRINTING METHOD HAVING PRINTING TYPE CHANGING PART

CROSS REFERENCE

This application is a division of and is based upon and claims the benefit of priority under 35 U.S.C. §120 for U.S. Ser. No. 10/667,381, filed Sep. 23, 2003, and claims the benefit of priority under 35 U.S.C. §119 from Japanese Patent Application Nos. JP 2002-276675, filed Sep. 24, 2002, JP 2002-276677, filed Sep. 24, 2002, JP 2003-301779, filed Aug. 26, 2003, the entire contents of each of which are incorporated herein by reference.

BACKGROUND OF THE INVENTION

1. Field of the Invention

The present invention relates to an image forming apparatus and a printing method of performing printing of original images which may have various sizes, and sorting of printed paper sheets.

2. Description of the Related Art

In recent years, an image forming apparatus (henceforth, referred to as a fusion machine) which has functions as respective devices, such as a printer, a copier, a facsimile device, and a scanner in a single housing, has come to be known. Such a fusion machine includes, for example, four types of applications (or application programs) corresponding to the printer, copier, facsimile device and scanner, respectively, and thus operates as a printer, a copier, a facsimile device, and a scanner, by appropriately applying these applications, while having relevant hardware resources such as a display part, a printing part, an image pick-up part, etc. in the single housing, used for actually executing these functions.

Moreover, such a fusion machine may further have functions of binding sheets of paper with staples on which original images are formed by the printing function of the machine, attaching a cover page thereto, or forming a punch hole therein, so as to appropriately group these sheets of paper.

Furthermore, such a fusion machine may sort these sheets of paper on which original images are formed upon ejecting them from the machine. The term 'sorting' means the following operation, for example. In case of preparing a plurality of copies for a set of pages, these pages are ejected from the machine after printing in an order such that each copy is separated from another copy, and, also, each copy has a pre-determined order of pages. Specifically, for example, as shown in FIGS. 1A through 1D, in case three copies of original images of three sheets each are formed, these three copies are ejected from the machine in the predetermined order of pages in each copy.

Such an operation of grouping or sorting is a work which is in many cases executed for a single job. However, such a printing job may include various types or manners, i.e., a single side printing, double side printing, a mixed printing in that original images having different sizes are mixed, or so. However, in case where different types of originals are mixed in a single printing jog, for example, in case single-sided printed paper sheets and double-sided printed paper sheets are mixed in a set of originals from which a plurality of copies are formed, the above-mentioned grouping or sorting may not be applied thereto.

SUMMARY OF THE INVENTION

The present invention has been devised for the purpose of solving such a problem, and, an object of the present invention is to provide an image forming apparatus and a printing method by which grouping or sorting can be applied to printed paper sheets even in case where the printed paper sheets produced from different forms of originals such as those including single-sided ones and double-sided ones in a mixed manner.

In order to solve the problem, according to the present invention, in an image forming apparatus which has hardware resources used for image formation processing and a program which performs processing concerning image formation, a part of changing a type of reading originals during a original group in which different types of originals are mixed being read, and a part of grouping printing paper on which images are formed according to the thus-read originals, are provided.

According to another aspect of the present invention, the above-mentioned part of changing a type of reading originals changes the type of reading originals according to instructions given by an operator.

According to another aspect of the present invention, the above-mentioned type of reading originals comprises a type of the original as to whether an image is formed on a single side or images are formed on double sides of the paper.

According to another aspect of the present invention, the above-mentioned type of reading originals comprises a size of the original.

According to another aspect of the present invention, the apparatus further includes a part of detecting the original in size.

According to another aspect of the present invention, the above-mentioned part of changing type of reading originals changes a type of reading originals if the size of the original read just before and the size of the original read subsequent thereto detected by said size detecting part are different from one another.

According to another aspect of the present invention, said size detecting part stops size detecting of the original in response to reading type changing instructions given by a user.

According to another aspect of the present invention, when the reading type changing part changes a type of reading originals, an image of original read subsequently is formed on another printing paper than one on which an image of original read immediately before the type of reading original is changed is formed.

According to another aspect of the present invention, in an image forming apparatus which has hardware resources used for image formation processing and a program which performs processing concerning image formation, a part of changing a type in which read original images are formed on printing paper sheets, during an original group in which different types of originals are mixed being read, and a part of grouping printing paper sheets on which images are formed according to the thus-read originals, are provided.

According to another aspect of the present invention, the above-mentioned part of changing a type of formation of read original images on printing paper changes the type of formation of read original image on printing paper according to instructions given by an operator.

According to another aspect of the present invention, the above-mentioned type of formation of read original images on printing paper comprises a type as to whether an image is formed on a single side or images are formed on double sides of the paper sheet.

According to another aspect of the present invention, when said part of changing type of formation of read original images on printing paper changes the type of formation of read original images on printing paper, an original image formed subsequently is formed on another printing paper than one on which an original image is formed immediately before the change of formation of read original image on the printing paper.

According to another aspect of the present invention, the above-mentioned type of forming an original image on printing paper comprises a size of the original.

According to another aspect of the present invention, the present invention further includes a part of detecting the original in size.

According to another aspect of the present invention, the above-mentioned part of changing type of formation of read original image on printing paper changes the size of printing paper on which an original image read subsequently is formed if the size of the original read just before and the size of the original read subsequent thereto detected by said size detecting part are different from one another.

According to another aspect of the present invention, said size detecting part stops size detecting of the original in response to reading type changing instructions given by a user.

According to another aspect of the present invention, in an image forming apparatus which has hardware resources used for image formation processing and a program which performs processing concerning image formation, a part of inserting a predetermined type of paper into a group of printing papers on which images are formed based on an original group in which different types of originals are mixed, and a part of grouping printing paper sheets on which images are formed according to the thus-read originals, are provided.

According to another aspect of the present invention, said part of inserting a predetermined type of paper inserts a predetermined type of paper subsequent to a printing paper on which an original image read just before is formed, according to a paper inserting instruction input by an operator during said original image group being read.

According to another aspect of the present invention, in an image forming apparatus which has hardware resources used for image formation processing and a program which performs processing concerning image formation, a part of forming an original image immediately subsequent to an input of an original separation instruction by an operator, on another printing paper than one on which an original image read immediately before the input of the original separation instruction is formed, during a original group in which different types of originals are mixed being read, and a part of grouping printing paper on which images are formed according to the thus-read originals, are provided.

According to another aspect of the present invention, an automatic original feeding part is further provided which automatically read the originals which are previously set is provided.

According to another aspect the present invention, page numbers are also printed on the printing paper sheets on which the original images are formed.

According to another aspect of the present invention, the page number is not formed on a side of the printing paper sheet on which the image is not formed.

According to another aspect of the present invention, a part of recording data of images is further provided which part records data of each image formed on the printing paper.

According to another aspect of the present invention, the data thus recorded by said part of recording image data are combined integrally.

According to another aspect of the present invention, said grouping part groups the group of printing paper sheets by attaching a front cover or a back cover thereto.

According to another aspect of the present invention, said grouping part groups the group of printing paper sheets by binding them with staples or punching them.

According to another aspect of the present invention, said grouping part groups the group of printing paper sheets in response to an operator's input of a finish instruction.

According to another aspect of the present invention, a part of sorting the group of printing papers upon ejection of a plurality of printing paper groups on which images are formed based on the original group is further provided.

According to another aspect of the present invention, said sorting part sorts and ejects the plurality of printing paper groups based on the above-mentioned image data recorded by said recording part.

According to another aspect of the present invention, said sorting part ejects the plurality of printing paper groups with changing the orientations thereof alternately or changing the positions thereof.

According to another aspect forth present invention, said sorting part sorts and ejects the printing paper groups in response to a finish instruction input by an operator.

According to the present invention, in a printing method in an image forming apparatus which has hardware resources used for image formation processing and a program which performs processing concerning image formation, a step of changing a type of reading originals, during a original group in which different types of originals are mixed being read, and a step of grouping printing paper sheets on which images are formed according to the thus-read originals, are performed.

According to another aspect of the present invention, in a printing method in an image forming apparatus which has hardware resources used for image formation processing and a program which performs processing concerning image formation, a step of changing a type according to which read original images are formed on printing paper, during a original group in which different types of originals are mixed being read, and a part of grouping printing paper sheets on which images are formed according to the thus-read originals, are performed.

According to another aspect of the present invention, in a printing method in an image forming apparatus which has hardware resources used for image formation processing and a program which performs processing concerning image formation, a step of inserting a predetermined type of paper into a group of printing papers on which images are formed based on an original group in which different types of originals are mixed, and a step of grouping printing paper sheets on which images are formed according to the thus-read originals, are performed.

According to another aspect of the present invention, in a printing method in an image forming apparatus which has hardware resources used for image formation processing and a program which performs processing concerning image formation, a step of forming an original image formed immediately subsequent to an input of an original separation instruction by an operator on another printing paper than one on which an original image read immediately before the input of the original separation instruction is formed, during a original group in which different types of originals are mixed being read, and a step of grouping printing paper sheets on which images are formed according to the thus-read originals, are performed.

According to another aspect of the present invention, in said grouping step, a step of sorting the group of printing papers upon ejection of a plurality of printing paper groups on which images are formed based on the original group is further performed.

Thereby, it becomes possible to obtain an image forming apparatus or a printing method by which printing paper sheets on which images are formed based on an original group in which different types of originals are mixed can be grouped or sorted.

BRIEF DESCRIPTION OF THE DRAWINGS

FIGS. 6A through 6D illustrate rotation sorting;

FIGS. 7A and 7B illustrate shift sorting;

FIGS. 10A through 10N and 10P through 10R illustrate a manner in which original images are copied in another example;

FIGS. 12A through 12N and 12P through 12T illustrate a manner in which original images are copied in another example;

FIGS. 13A through 13N and 13P through 13T illustrate a manner in which original images are copied in another example;

FIGS. 14A through 14M illustrate a manner in which original images are copied in another example;

FIGS. 15A through 15N illustrate a manner in which original images are copied in another example;

FIGS. 16A through 16L illustrate a manner in which original images are copied in another example;

FIGS. 17A through 17L illustrate a manner in which original images are copied in another example;

FIGS. 18A through 18L illustrate a manner in which original images are copied in another example;

FIGS. 19A through 19N illustrate a manner in which original images are copied in another example;

FIGS. 20A through 20N and 20P illustrate a manner in which original images are copied in another example;

DESCRIPTION OF THE PREFERRED EMBODIMENT

Hereafter, an embodiment of the present invention will be described with reference to figures. The term 'a size of an original' means a standard size of paper such as A4, B5, or so, for example, which is generally used for printing paper. The term 'a type of original as to whether an image is formed on single side or images are formed on double sides' means a single-sided original or a double-sided original, for example. The term 'a type of reading an original' means a size of an original to be read, i.e., an original of A4, for example, or a type (or manner) of reading a single-sided original or a double-sided original, for example. Similarly, the term 'a type of formation of an original image onto a printing paper sheet' means a size of an original, i.e., an original of A4, for example, to be formed on the printing paper, or a type (or manner) as to whether an original image is formed on a single side of the paper or original images are formed on double sides of the paper, for example. Thus, the term 'type' is determined by a size of original image or by a manner as to whether single side of paper is applied or double side of a paper is applied for reading an image or forming an image, for example.

Furthermore, the term 'a printing paper other than one or different from one on which an original image is formed' means another paper sheet or different paper sheet which has the same size than that on which the original image is formed is applied. The term 'printing paper sheet' means a sheet of paper on which an image is formed, or has been formed.

Figure 1:
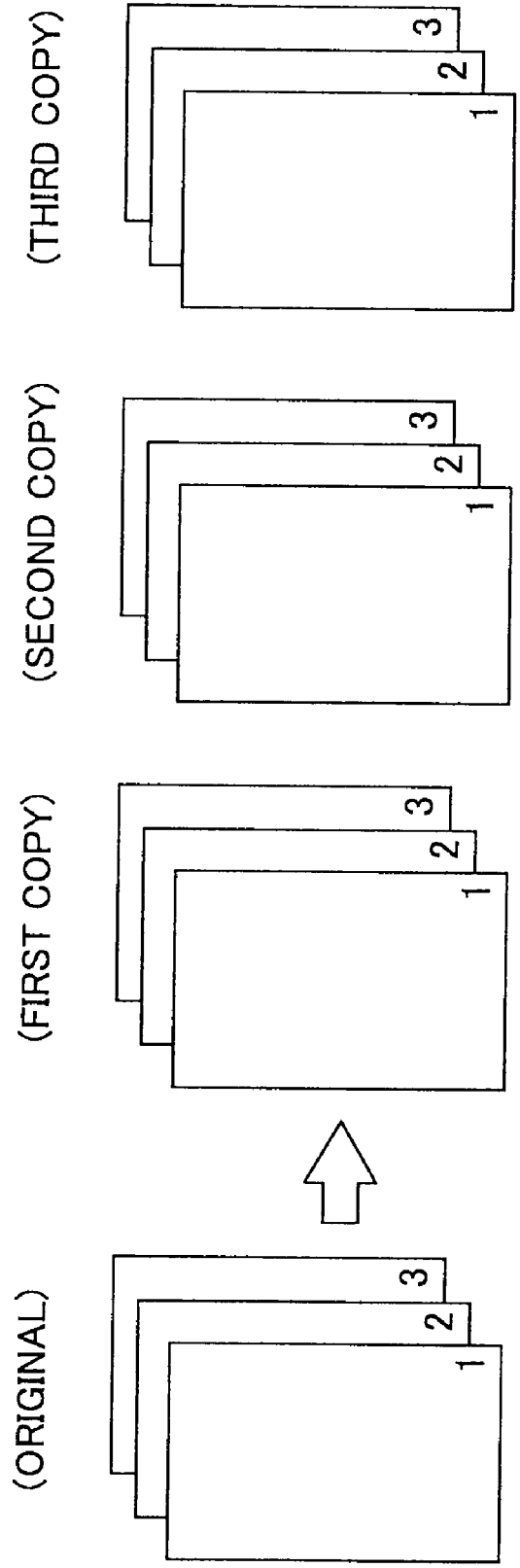
FIGS. 1A through 1D illustrate a manner of sorting in one example.
Figure 2:
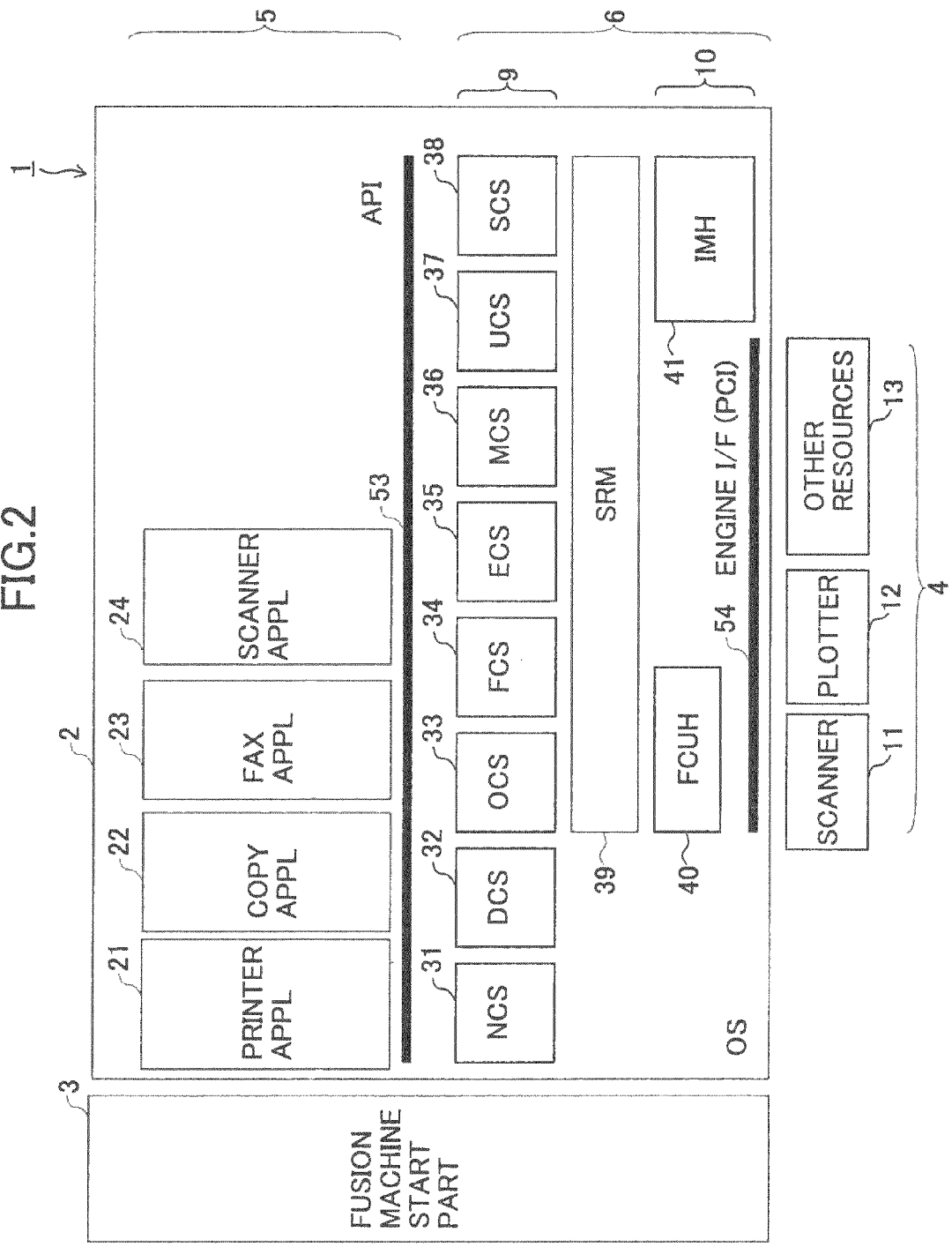
FIG. 2 shows a configuration of one embodiment of a fusion machine according to the present invention.

FIG. 2 shows a configuration of one embodiment of a fusion machine according to the present invention. The term 'fusion machine' means a machine which is a new type of image processing apparatus by which various types of image processing functions are achieved, i.e., a copying function, a printing function, a facsimile function, a scanning fruition, and so forth, in a single unit.

The fusion machine 1 includes, as shown, a software group 2, a fusion machine starting part 3, and hardware resources 4. The fusion machine starting part 3 is first executed at a time of a power supply start in the fusion machine 1, and starts an application layer 5 and a platform layer 6. For example, the fusion machine starting part 3 reads programs of the application layer 5 and the platform layer 6 from a hard disk drive unit (henceforth HDD), etc., transfers each program which is thus read into a memory area, and starts it. The hardware resources 4 include a scanner 11, a plotter 12, and other hardware resource 13, such as a facsimile device.

Moreover, the software group 2 includes the application layer 5 and the platform layer 6 which are started by an operating system (henceforth OS), such as a UNIX (registered trademark). The application layer 5 includes programs which perform processing respectively particular to user services concerning image formation of printing, coping, facsimile transmission/reception, scanning, network file processing, etc.

The application layer 5 includes a printer application 21, a copier application 22, a facsimile application 23 and a scanner application 24, which are used to cause the fusion machine to act as a printer, a copier, a facsimile machine and a scanner, respectively.

The platform layer 6 includes a control service layer 9 which interprets processing instructions coming from the application layer 5, and generates acquisition instructions for the hardware resources 4, a system resource manager (henceforth SRM) 39 who manages one or more hardware resources 4, and arbitrates the acquisition instructions coming from the control service layer 9, and a handler layer 10 which manages the hardware resources 4 according to the acquisition instructions coming from the SRM 39.

The control service layer 9 is configured to include one or a plurality of service modules such as a network control service (referred to as a NCS) 31, a delivery control service (referred to as a DOS) 32, an operation panel control service (referred to as an OCS) 33, a facsimile control service (referred to as an FCS) 34, an engine control service (referred to as an ECS) 35, a memory control service (referred to as a MCS) 36, a user information control service (henceforth UCS) 37, and a system control service (henceforth SCS) 38.

The platform layer 6 is configured to include an API 53 which can receive processing instructions from the application layer 5 with a predetermined function. The above-mentioned OS carries out parallel execution of respective ones of software of the application layer 5 and the platform layer 6 regarding them as respective processes.

The process of the NCS 31 provides a service which can be used in common by applications which need a network I/O, distributes data received by each protocol from the network to each of these applications, or acts as an agency at a time of transmitting data coming from each application to the network. For example, the NCS 31 controls data communications with a network apparatus connected via the network by an HTTP (Hyper TextTransfer Protocol) with an httpd (HyperText Transfer Protocol Daemon).

The process of the DCS 32 controls distribution of stored documents etc. The process of the OCS 33 performs control of an operation panel so as to control thereby communications between an operator and the control system of this machine. This operation panel acts as an input part for the operator to operate thereby the fusion machine 1. The process of the FCS 34 provides an API for performing facsimile transmission/reception of a PSTN or an ISDN with the application layer 5, registration/reference of various facsimile data managed by a memory for backup, facsimile reading, facsimile reception printing, etc.

The process of the ECS 35 controls engine parts, such as the scanner 11, plotter 12, and other hardware resources 13. The process of the MCS 36 performs memory control for acquisition/release of memory area, use of the HDD 68, etc. The process of the UCS 37 manages user information.

The process of the SCS 38 performs application management, operation part control, system window display, LED display, hardware resource management, interruption application control, etc.

The process of the SRM 39 performs control of the system and management of the hardware resources 4 in cooperation with the SCS 38. For example, according to an acquisition instruction from a higher layer for a use of a hardware resource 4, such as a scanner 11, a plotter 12 or so, the process of the SRM 39 arbitrates and carries out execution control thereof.

Concretely, the process of the SRM 39 determines whether or not a hardware resource 4 which is requested can be used, or whether or not it is already in use, and, then, when it is usable, the process of the SRM 39 informs of this matter to the higher layer. Moreover, the process of the SRM 39 performs scheduling for using hardware resources 4 in response to the acquisition instructions coming from the higher layer, and executes the instructions (for example, executes paper conveyance and imaging operation in the printer engine, memory reservation, file generation, etc.) directly.

The handler layer 10 includes a facsimile control unit handler (henceforth FCUH) 40 which manages a facsimile control unit (henceforth FCU) which will be described later, and an image memory handler (henceforth IMH) 41 which manages a memory area assigned to a process after assigning the memory area to the process. The SRM 39 and FCUH 40 make a processing request to a hardware resource 4 using an engine I/F 54 which enables transmission of the processing request to the hardware resource 4 with a predetermined function.

The fusion machine 1 can perform processing which is required in common by each application in the platform layer 6 in a centralization manner. Next, a hardware configuration of the fusion machine 1 will be described.

Figure 3:
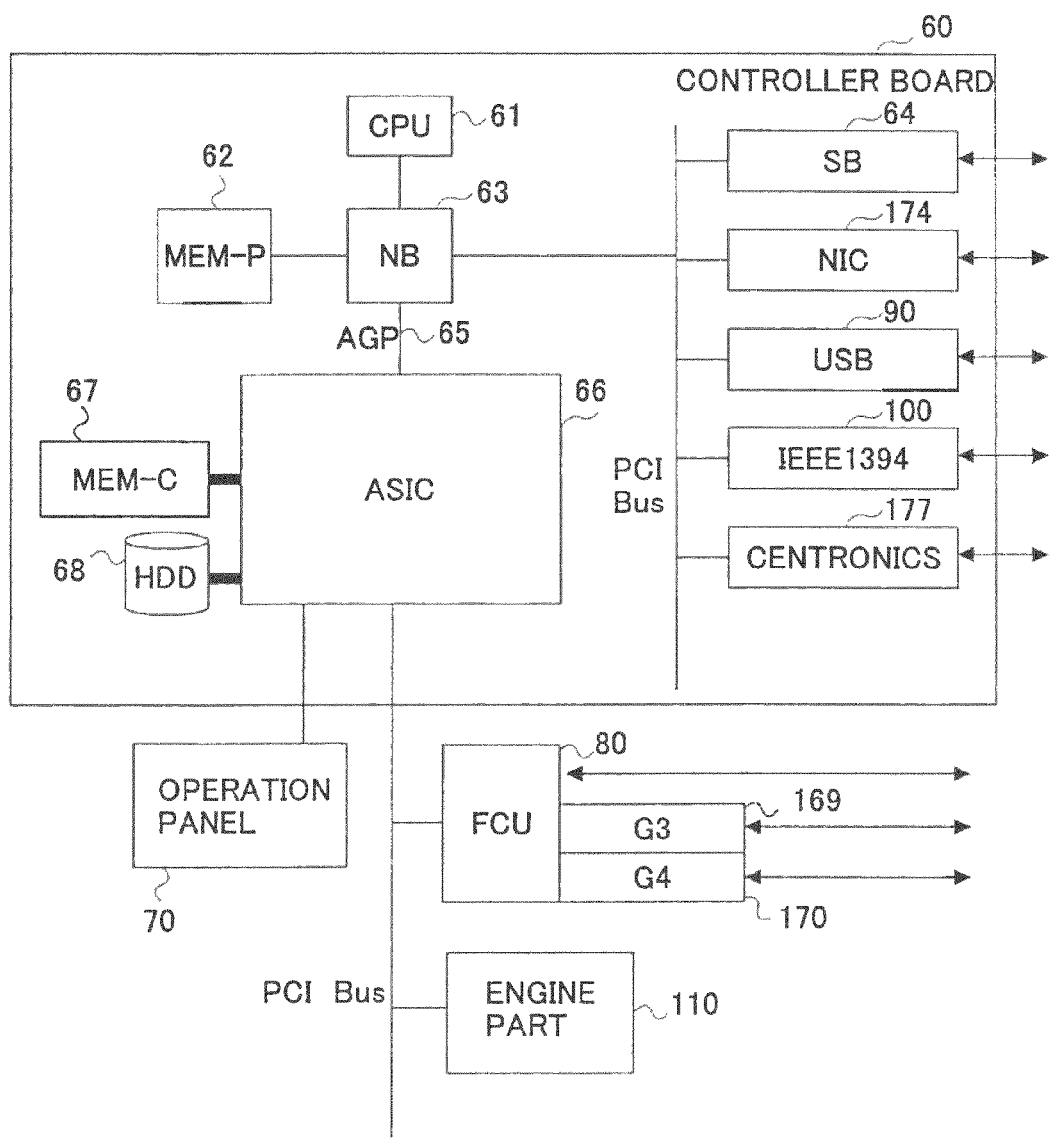
FIG. 3 shows hardware configuration of the fusion machine shown in FIG. 2.

FIG. 3 shows the hardware configuration of the embodiment of the fusion machine according to the present invention. The fusion machine 1 includes a controller board 60, the operation panel 70, the FCU 80, and the engine part 110. The FCU68 has a G3 standard handling unit 169 and a G4 standard handling unit 170.

The FCU80, the engine part 110, and the operation panel 70 are connected to an ASIC 66 of the controller board 60 by a PCI bus.

The engine part 110 acts as a reading type changing part, a printing type changing part, a paper insertion part, an original image separation part, a grouping part, a sorting part, and a size detection part. In particular, an ADF included in the engine part 110 acts as an automatic original feeding part. The engine part 110 is controlled by the ECS 35 which receives instructions from applications, as mentioned above. Moreover, a page number and a chapter number which will be described later are also controlled by the ECS 35.

The controller board 60 includes a CPU 61, a system memory (MEM-P) 62, a north bridge (henceforth NB) 63, a south bridge (henceforth SB) 64, the ASIC 66, a local memory (MEM-C) 67, the HDD 68 acting as a recording part, an NIC (Network Interface Card) 174, a USB device 90, an IEEE 1394 device 100, and a centronics device 177.

The SB 64, NIC 174, USB device 90, IEEE1394 device 100, and centronics device 177 are connected to the NB 63 via a PCI bus.

While the ASIC 66, local memory 67, HDD 68, etc. are connected together in the controller board 60, the CPU 61 and ASIC 66 are connected via a chip set of the NB 63. Thus, the CPU 61 and ASIC 66 are connected through the NB63, and thereby, an interface of the CPU 61 should not have been disclosed.

In addition, the ASIC 66 and NB 63 are connected not via the PCI bus but via an AGP (Accelerated Graphics Port) 65. Thus, in order to carry out execution control of one or more processes in the application layer 5 and the platform layer 6 shown in FIG. 2, the ASIC 66 and NB 63 are connected not via a low-rate PCI bus but via the AGP65. Thereby, it becomes possible to improve the performance.

The CPU 61 performs control of the whole fusion machine 1. The CPU 61 starts and executes the NCS31, DCS 32, OCS 33, FCS 34, ECS 35, MCS 36, UCS 37, SCS 38, SRM 39, FCUH 40 and IMH 41 regarding them as respective processes with the OS, and, also, starts and executes the printer application 21, copy application 22, facsimile application 23 and scanner application 24 of the application layer 5.

The NB 63 is a bridge for connecting the CPU 61, the system memory 62, the SB 64 and the ASIC 66. The system memory 62 is a memory used as a memory for drawing images in the fusion machine 1, or so. The SB 64 is a bridge for connecting the NB 63, ROM, PCI bus, and peripheral devices. Moreover, the local memory 67 is a memory used as an image buffer or a code buffer for a coping operation.

The ASIC 66 is a special IC for image processing which has hardware devices for the image processing. The HDD 68 is storage for performing storage of image data, storage of document data, storage of programs, storage of font data, storage of various forms, etc. Moreover, the operation panel 70 is an operation part which performs a display various information for an operator while receiving operation input from the operator. Detailed explanation of this operation panel 70 will now be described.

Figure 4:
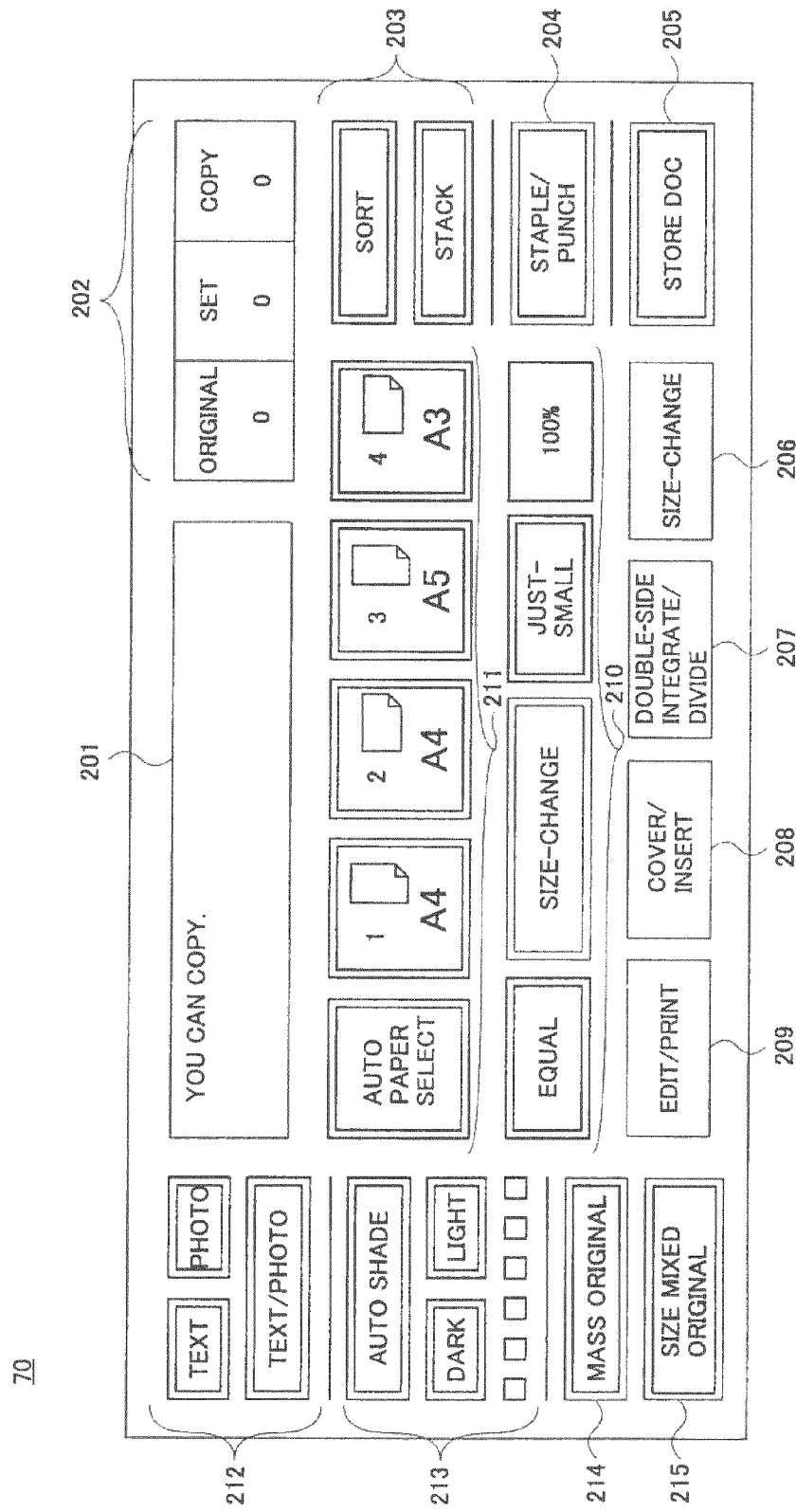
FIG. 4 shows an operation panel of the fusion machine shown in FIG. 3.

As the operation panel 70 is shown in FIG. 4, various keys, etc. are displayed on a touch-panel sensor, and an operator touches them so as to input instructions into the fusion machine therewith.

Next, the keys and so forth displayed on the operation panel 70 will be described. An information display part 201 displays information, such as a present state of the fusion machine 1, to the operator. A copy number display part 202 displays information, such as, how many sheets an original document has, how many copies are to be made in case sorting processing is set, how many sheets of printing or copying has been completed, etc.

Sorting/stacking keys 203 are used for specifying whether sorting, in which printing paper sheets are ejected for each copy is performed or stacking in which printing paper is ejected for each page is performed.

Figure 5:
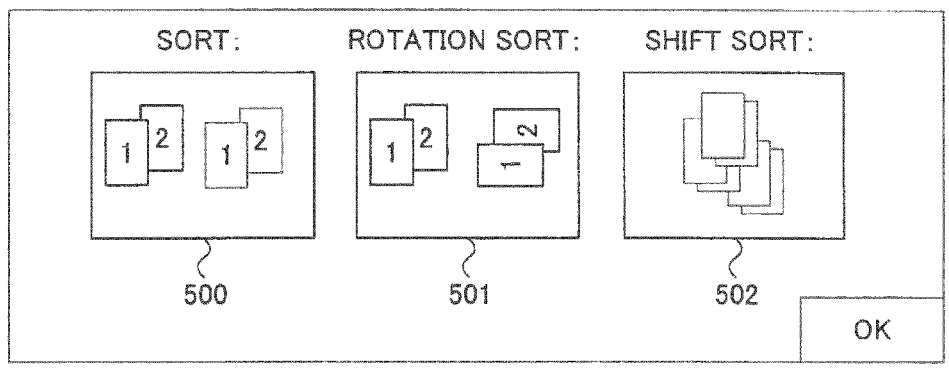
FIG. 5 shows a window on which a type of sorting is selected.

When the operator presses the sorting key, a window shown in FIG. 5 is displayed. The window shown in FIG. 5 is a window for selecting a type of sorting. A sorting key 500 is a key for performing usual sorting. A rotation sorting key 501 is a key for performing sorting such that the printed paper sheets are ejected while the orientation thereof is changed alternately for each copy, as shown in FIGS. 6A through 6D. A shift sorting key 502 is a key for ejecting the printed paper sheets while changing the position for each copy, as shown in FIGS. 7A and 7B. Thus, in the fusion machine 1, one of these three types of sorting can be selected.

Returning to the explanation of FIG. 4, a staple/punch key 204 is a key for performing a binding operation such as to bind the printed paper sheets with staples, or forming a punch hole in the printed paper sheets.

A document storage key 205 is a key for storing data of a read-in document with a title thereof. A size-change key 206 is a key for specifying the size of the original or printing paper so as to produce an expanded/reduced copy, or so. A double-side combination/division key 207 is a key for collecting a plurality of pages of original images into a single sheet of printed paper sheet, or dividing a single sheet of original image into plurality of pages.

A cover/inserting paper key 208 is a key for attaching a cover to the printed paper sheets or inserting an inserting paper thereinto. An editing/printing key 209 is a key for performing edition of the contents of printing, or producing printed paper sheets with attaching thereto a registered stamp. An expansion/reduction part 210 includes keys used for expanding/reducing an original image. A paper selection part 211 includes keys for selecting a type of printing paper.

An original image type selection part 212 includes keys for achieving a reading operation according to a predetermined reading condition suitable for a text image, a photographic image or so. A shade adjustment part 213 includes keys for printing shade adjustment and a shade display part which displays shade samples. A large number of original image key 214 is a key for executing one set of printing jobs for a very large number of printed paper sheets by dividing the jobs into several steps. An original size mixture key 215 is a key for handling originals which have different sizes with a common width.

Figure 8:
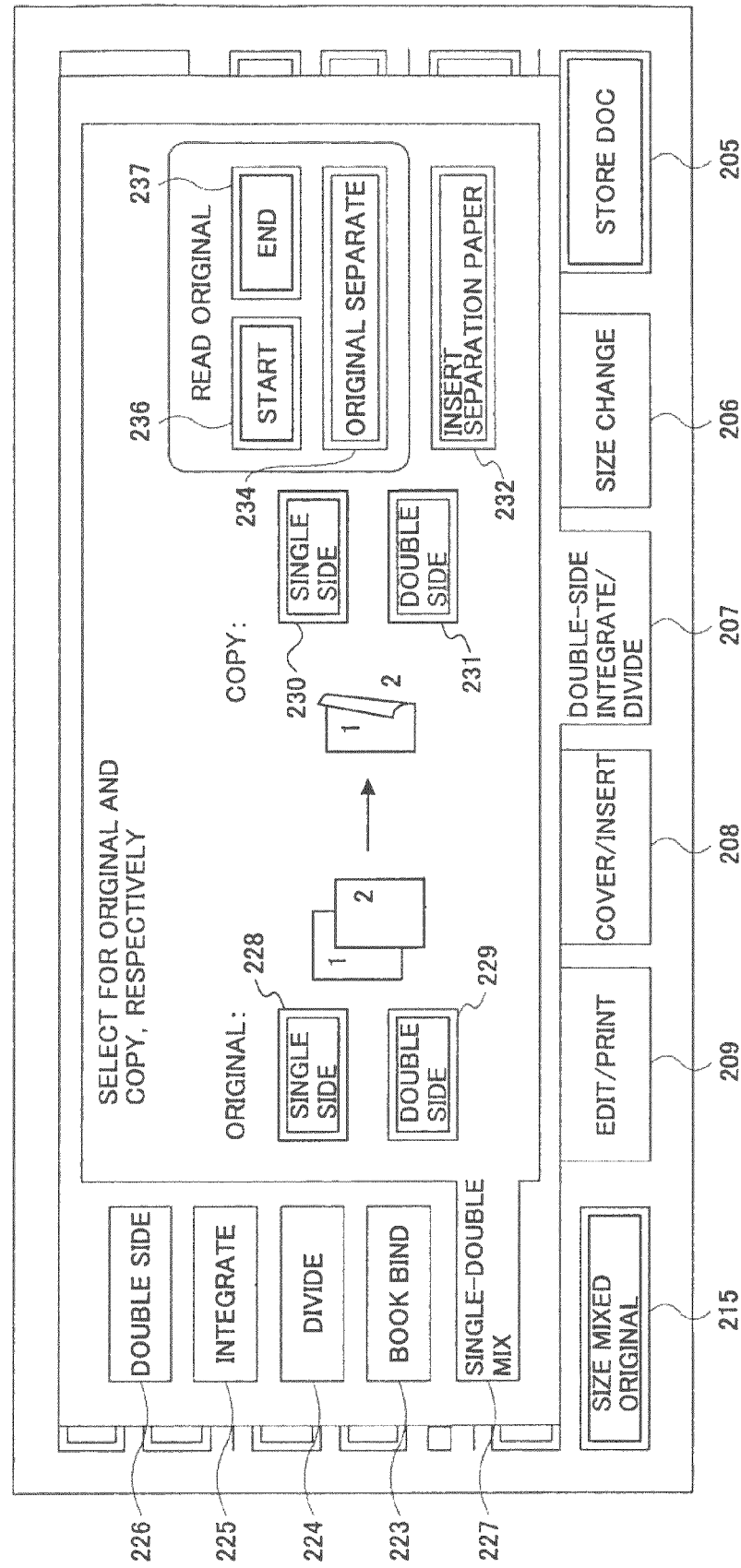
FIG. 8 shows another example of the operation panel.

Next, an operation panel 70 shown in FIG. 8 will be described. The operation panel 70 shown in FIG. 8 is a window opened as a result of the double-side combination/division key 207 being pressed, and then, a single/double mixture key 227 being then further pressed. Keys displayed on this window will now be described. First, a one side key 228 and a double side key 229 are keys for inputting by the operator as to whether or not an original to be read in is of a single-sided one or a double-sided one. When the one side key 228 or the double side key 229 is pressed by the operator, a notice of reading type change is input into the copy application 22. This notice of reading type change is then notified to the ECS 35 from the copy application 22, and the ECS 35 controls the engine part 110 according to the notice.

A one side key 230 and a double side key 231 are keys for an operator to input as to whether a printed paper sheet should be produced into a single-sided one or a double-sided one. When the one side keys 230 or the double side key 231 is pressed by the operator, a notice of printing type change is input into the copy application 22. This notice of printing type change is then notified to the ECS 35 from the copy application 22, and the ECS 35 controls the engine part 110 according to the notice.

A start key 236 is a key for starting reading of original images. An end key 237 is a key for terminating the reading of original images. When this end key 237 is pressed by an operator, a notice of end is input into the copy application 22, the notice of end is then notified to the ECS 35 from the copy application 22, and the ECS 35 controls the engine part 110 according to the notice.

An original separation key 234 is a key for forming, immediately after this key is pressed, an image on another printing paper sheet than one on which an image has been formed immediately before this key is pressed. When this original separation key 234 is pressed by an operator, a notice of original separation is input into the copy application 22. Then, this notice of original separation is further notified to the ECS 35 by the copy application 22, and the ECS 35 controls the engine part 110 according to the notice.

An insert separation paper key 232 is a key for separating printed pages by inserting a paper sheet therebetween. When this insert separation paper key 232 is pressed by the operator, this notice of paper insertion is input into the copy application 22.

A bookbinding key 223 is a key for printing a plurality of sheets of original in such a manner that the thus-printed pages are ejected in a predetermined order of pages. A division key 224 is a key for printing a two-page spread original image or double-sided original images into respective paper sheets. An integration key 225 is a key for integrating a plurality of pages of original images into a single double-sided printed paper sheet. A double side key 226 is a key for performing a double side copying operation.

Next, actual printing processing will be described. FIGS. 9A through 9N and 9P through 9R show processing of printing an original group in which single-sided originals and double-sided originals are mixed, using the above-mentioned original separation key, and then, binding the thus-produced printed paper sheets by staples, using the above-mentioned end key.

In FIGS. 9E through 9M, an original reading mode change key 191 means either one of the above-mentioned single side key 228 and double side key 229 of FIG. 8. A printing mode change key 192 means either one of the above-mentioned single side key 230 and double side key 231 of FIG. 8. An scanning operation 195 means a reading operation. A storage operation 196 means an operation of storing data of the read original images into a storage such as the above-mentioned HDD 68. A print operation 197 means an operation of printing read images onto printing paper sheets. A page printing 198 means an operation of printing a page number on a printed paper sheet. A post-processing 199 means processing of binding produced printed paper sheets with staples or makes a punch hole therein.

A state of each operation is shown by a straight line and pulse-like lifted portions in each of FIGS. 9D through 9M. A single straight line means that no relevant operation is performed, while each pulse-like lifted portion having a number given therein means an occasion at which the relevant operation is actually performed. The number given to each lifted portion means a number which is given each time a page of image is formed on one side of a printing paper sheet, and, thus, indicates the page number.

As to each key, i.e., FIGS. 9E through 9H, a simple straight line means that the relevant key is not pressed while a pulse-like lifted portion means the key is pressed.

Figure 9C:
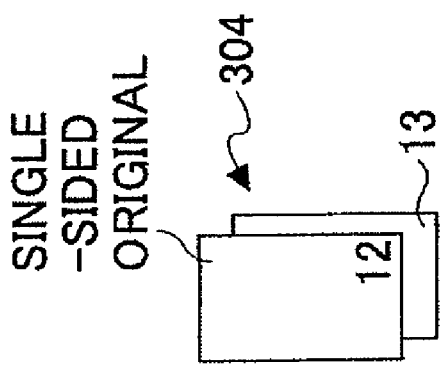
FIGS. 9A through 9N and 9P through 9R illustrate a manner in which original images are copied.
Figure 9B:
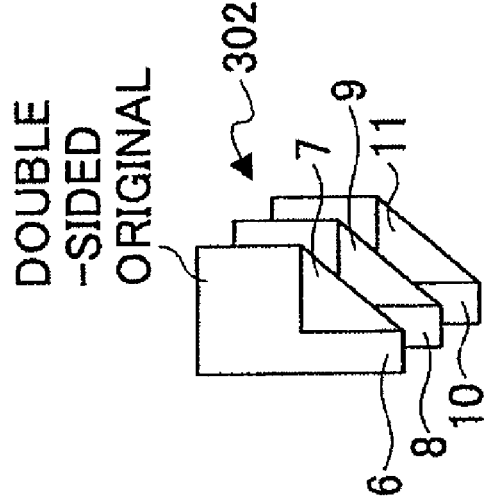
Figure 9A:
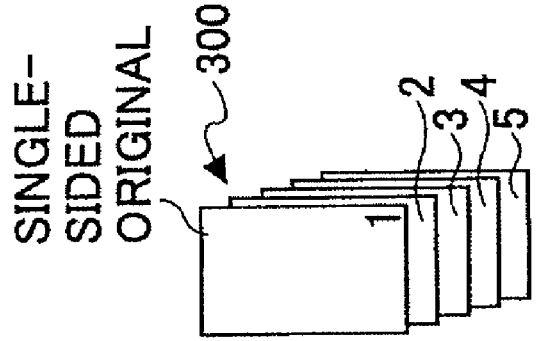

Next, the contents of the printing processing which FIGS. 9A through 9R illustrate will be described. First, the original reading mode change key 191 is pressed to specify 'single side' (or the single side key 228 is pressed). Moreover, the printing mode change key 192 is pressed to specify 'double side' (or the double side key 231 is pressed).

Then, printing starts in response to the start key 236 being pressed. First printing is of five double-sided copies from one side originals 300. First, the first sheet of the one side original 300 is read by a scanning operation, and is stored in storage operation into the storage. The first sheet is not yet printed out at this time, but the second sheet of the original is read in response to the start key 236 being pressed, and it is stored in the storage. After the second sheet of the original is thus stored in the storage, the first and second sheets of the originals are printed out with page numbers, and, thus, a double-sided copy of pages 1 and 2 is produced. Also in the following operation, the page number is put on a printed page.

Thus, in case the double-sided copy is produced from single-sided originals, after the both original images to form the double sides are read and stored into the storage, they are printed out for a single double-sided printing paper sheet.

The original images on the third and fourth sheets following are similarly printed, and a double-sided copy of pages 3 and 4 is thus produced. Next, the original image of the fifth sheet is read and it is stored into the storage. At this time, the operator presses the original separation key 234 since printing of the single-sided originals 300 is finished. The original image of the fifth sheet is thus printed as the page 5 in a single-sided copy as shown in FIG. 9N.

Thus, the single-sided originals 300 are copied, into three sheets of printing papers 301 as shown in FIG. 9N through the above-described processing. By the function of the original separation key 234, a subsequent original image is prevented from being formed on the reverse side of the printing paper sheet which has the above-mentioned fifth page formed on the obverse side thereof.

Originals to be copied then are double-sided originals 302 of three sheets shown in FIG. 9B. In this case, in order to change a type of reading original image since the original changes from the single-sided one into the double-sided one, the original reading mode change key 191 should be pressed by the operator, i.e., the double side key 229 should be pressed.

Then, copying of the double-sided originals 302 is started in response to the start key 236 being pressed. Similar to the above-described case of copying the single-sided originals, an obverse side of the first sheet of the double-sided original 302 is read by scanning operation, and is stored by storage operation into the storage.

The first sheet image is not yet printed out at this time, but the reverse side of the same sheet is read in response to the start key 236 being pressed by the operator, and it is stored at this time at storage. After this reverse side image data is stored in the storage, the thus-stored observe and reverse side images of the first sheet of the original are printed out with respective page numbers, and, thus, a double-sided copy of pages 6 and 7 is produced as shown in FIG. 9P.

The obverse and reverse sides of the following sheet of the original are also printed similarly, and a double-sided copy of pages 8 and 9 is produced as shown in FIG. 9P. Next, the obverse side of the third sheet is read and is stored in the storage. At this time, the operator presses the original separation key 234. As a result, the obverse side of the third sheet of the original is printed as a page 10 in a single-sided copy. At this time, no page number is printed on the reverse side of this single-sided copy of page 10.

The double-sided originals 302 are thus copied into the three sheets of printing paper 303 as shown in FIG. 9P with the above-described processing.

Thus, even in case of processing a double-sided original sheet, it is possible, with the function of the original separation key 234, to produce a single-sided copy which has the page of original image only on the obverse side thereof. At this time, the reverse side image of the relevant double-sided original sheet, which has not been copied, may be copied into another printing paper sheet (as shown in FIG. 9Q).

The original images which should be then copied are the reverse side image which has not been copied yet as mentioned above, and other two sheets of single-sided original 304 shown in FIG. 9C. In this case, since the original changes from the double-sided one to the single-sided one, the original reading mode change key 191 should be pressed, i.e., the single side key 228 should be pressed. Moreover, at this time, in order to also change the type of forming images onto printing paper from a double side printing into single side printing, the printing mode change key 192 should also be pressed, i.e., the single side key 230 should be pressed.

The page 11 which is the reverse side of the original sheet has been already read by the scanning operation, and stored by the storage operation in the storage. Then it is printed in a single side printing manner. Similarly, the first and second sheets of the single-sided originals 304 are copied in the single side printing manner.

By the above-described processing, the remaining reverse side and other two sheets of single-sided originals 304 are copied into three sheets of printing paper as shown in a copy 305 of FIG. 9Q.

Then, post-processing is performed in response to the end key 237 being pressed by the operator. In this case, as the post-processing, processing of staple is applied, for example. Then, as shown in a copy 306 of FIG. 9R, the copies 301, 303, and 305 are bound by staples. Alternatively, a punch hole may be made in the copies for the purpose of binding. Moreover, the data recorded in the storage as shown in FIG. 9J are integrated into a single file. Then, the original image data thus stored and integrated into the file may be again used for producing another set of copy without again reading the original.

As one example thereof, a description will now be made with reference to FIGS. 10A through 10N, and 10P through 10R. In this example, after the first copy is bound by the staples or in a use of the punch hole formed in the copy, other copies are provided with a sorting operation. FIGS. 10A through 10R illustrate processing in which the printing and sorting operations are performed for the other copies after the end of the processing same as that described above with reference to FIGS. 9A through 9R. As the processing performed before the end key 237 is pressed at the end is the same as that shown in FIGS. 9A through 9Q, the duplicated description is omitted.

Post-processing is performed in response to the end key 237 been pressed as shown in FIG. 10M. Also in this case, it is assumed that the post-processing applied is one in use of staples. Accordingly, as shown in a copy 329 of FIG. 10R, copies 301, 303 and 305 are bound by staples. Alternatively, also it is possible that they are bound with a punch hole formed therein.

Then, using the data of the original images recorded in the storage required number of copies are produced, sorted and ejected, as shown in the sorting operation 601 of FIG. 10K. In the case of FIGS. 10A through 10R, total three copies are produced as shown.

As described above with reference to FIGS. 9A through 9R and 10A through 10R, from the original group in which double-sided originals and single-sided originals are mixed as shown in FIGS. 9A through 9C and 10A through 10C, various types of copying/printing, sorting and binding (in use of staples or punch hole) operations can be achieved in use of the original separation key 234, the original reading mode change key 191, and the printing mode change key 192. Furthermore, according to the embodiment of the present invention, by the above-described processing, grouping of the original group in which different types of originals are mixed can be achieved in a single job. Accordingly, it becomes possible for a user to easily handle a complicate original such as the above-mentioned single-sided and double-sided mixed originals, and produce a desired type of copies therefrom.

Moreover, it becomes possible to sort and eject a required number of copies using the data of the original images once recorded in the storage.

Figure 11:
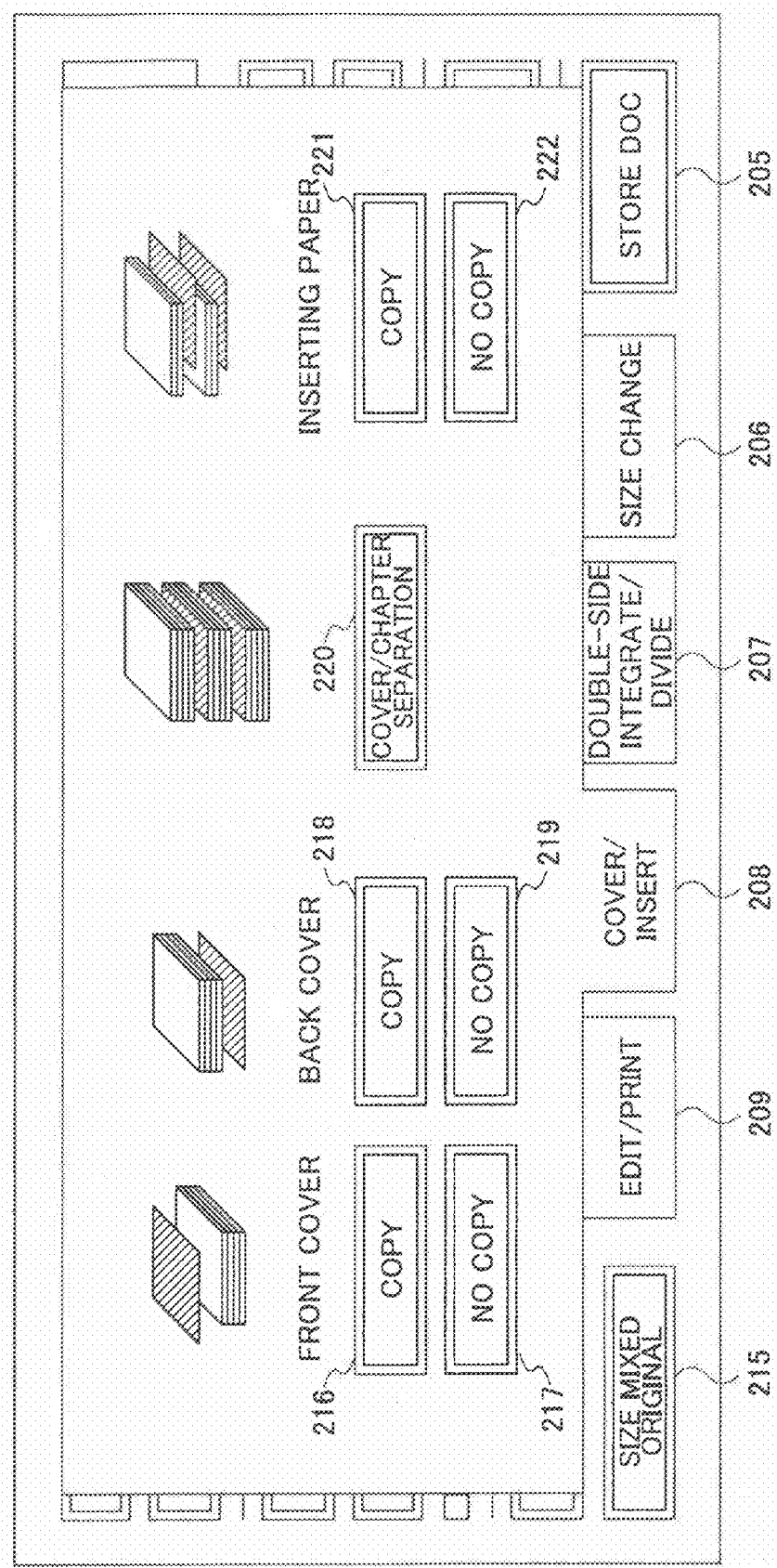
FIG. 11 shows another example of the operation panel.

Next, printing processing including insertion of a front cover, a back cover, or an insertion paper into printed paper sheets will be described. An operation panel 70 used when carrying out such printing processing will be first described using FIG. 11. The operation panel 70 shown in FIG. 11 is a window opened in response to the cover/insert key 208 shown in FIG. 8 being pressed.

Keys displayed on this window will now be described. First, a copying key 216 and a not copying key 217 are keys by which it is set whether or not printing is made on a front cover. Similarly, a copying key 218 and a not copying key 219 are keys by which it is set whether or not printing is made on a back cover. Furthermore, a copying key 221 and a not copying key 222 are keys by which it is set whether or not printing is made on an inserting paper. Moreover, a cover and chapter separation key 220 is a key by which it is set whether or not a cover is attached or chapter separation is made with an insetting paper.

Next, printing processing which includes attaching a cover or so in printed paper sheets will now be described using FIGS. 12A through 12N and 12P through 12T. First, it is assumed that, in order to attach a cover, the cover and chapter separation key 220 is pressed. Moreover, the original reading mode change key 191 is pressed to specify 'single side'. The printing mode change key 192 is pressed to specify 'double sides'.

Printing starts in response to the start key 236 being pressed by the operator. The first printing is for five double-sided copies from a single-sided original 300. First, the first sheet of the single-sided original 300 is read by scanning operation, and is stored by storage operation into the storage. The first sheet is not printed yet at this time but a front cover 307 is printed first. And the original image of the second sheet is read in response to the start key 236 being pressed by the operator, and is stored in the storage. After the original image of the second sheet is thus stored in the storage, the original images of the first and second sheets thus stored are printed out together with respective page numbers, and, thus, a double-sided copy of the pages 1 and 2 is produced. Moreover, not only the page numbers but also a chapter number is printed on each printed side of the paper of the copy.

The original images of the following third and fourth sheets are similarly printed, and another double-sided copy of the pages 3 and 4 is thus produced. Next, the original image of the following fifth sheet is read and it is stored in the storage. At this time, the single-sided original 300 is finished as shown in FIGS. 12A and 12P, and, thus, the operator presses the insert separation paper key 232 shown in FIG. 8. The original image of the fifth sheet is thus printed as a page 5 of a single-sided copy in response to the insert separation paper key 232 being thus pressed.

The single-sided original 300 is thus copied and printed into three sheets of printing paper 301 shown in FIG. 12P through the above-described processing.

The original images to be copied subsequently are of double-sided original 302 of three sheets shown in FIG. 12B. In this case, since the original changes from a single-sided one to the double-sided one, the original reading mode change key 191 should be pressed to specify 'double sides'.

Then, printing of the double-sided original 302 is started in response to the start key 236 being pressed by the operator. Similarly to the above-described case of the single-sided original, the obverse side of the first sheet of the double-sided original 302 is read by scanning operation, and is stored by storage operation into the storage.

The first sheet is not printed yet at this time but a separation paper sheet 308 is printed first as shown in FIG. 12Q. And the reverse side of the above-mentioned first sheet is read in response to the start key 236 being pressed, and is stored into the storage. After the reverse side image is thus stored, the obverse and reverse side images thus stored are printed out with respective page numbers into another double-sided copy of pages 6 and 7 as shown in FIG. 12Q.

The obverse and reverse sides of original images of the following second sheet are also printed similarly, and another double-sided copy of pages 8 and 9 are thus produced. Next, the obverse side of the following third sheet is read and it is stored into the storage. At this time, it is assumed that the operator presses the original reading mode change key 191 to specify 'single side' in order to change the original reading type from the double side reading into single side reading. The fusion machine determines this pressing action of the original reading mode change key 191 as a separation of the original, and the obverse side of the original image of the above-mentioned third sheet is printed as a page 10 of a single-sided copy.

The double-sided original 302 is thus copied/printed into three sheets of printing papers 303 as shown in FIG. 12Q by the above-described processing.

Original to be subsequently copied/printed includes the reverse side which is left unprinted (page 11) of the third sheet of the above-mentioned double-sided original 302, and another single-sided original 304 of two sheets (pages 12 and 13). In this case, printing is to be made of single side, and thus the printing mode change key 192 is pressed to specify 'single side'.

First, the above-mentioned reverse side image of page 11 is read by scanning operation, and is stored in storage operation. Then, it is printed in a single side printing manner. Similarly, the first and second sheets of the single-sided original 304 are printed also in a single side printing manner.

By the above-described processing, the remaining reverse side image and the other single-sided original 304 of two sheets are printed into three sheets of printing paper sheets (copy 305) as shown in FIG. 12R.

And post-processing is performed in response to the end key 237 being pressed. It is assumed that post-processing to be applied is to add a back cover and to bind with staples in the case of FIGS. 12A through 12T, and, thus, a back cover 309 is printed first. And as shown in FIG. 12T (copy 306), a front cover 307, a separation paper sheet 308, a back cover 309, and the above-mentioned copies 301, 303 and 305 are bound with staples.

Processing which includes a sorting operation in addition to the above-described processing will now be described with reference to FIGS. 13A through 13N and 13P through 13T. FIGS. 13A through 13T illustrate processing in which a sorting operation is performed after the end of processing such as that described above with reference to FIGS. 12A through 12T. Before sorting, the processing is same that of FIGS. 12A through 12T, and duplicated description thereof is omitted.

After the end key 237 is pressed, in use of data of the original once recorded in the storage, as shown in FIG. 13L, in a sorting operation 602, a required number of copies are sorted and ejected from the fusion machine. In the case of FIGS. 13A through 13T, total three copies (each including pages 1 through 13) are produced.

Thus, by using the original separation key 234, the original reading mode change key 191, the printing mode change key 192, and the insert separation paper key 232 for an original group in which different types of originals, i.e., double-sided originals and single-sided originals are mixed, it becomes possible to execute, within a single job, processing of grouping the printed paper sheets (copy) with insertion of the separation paper sheet into the printed paper sheets, or attachment of a front cover and a back cover thereto.

Moreover, it becomes possible to produce, sort and eject the required number of copies using the data of the original images once recorded in the storage.

Next, processing of printing an original group including at this time different paper sizes in a mixed manner according to the related art will be described using FIGS. 14A through 14M. After that, in comparison therewith, processing of printing using the original separation key 234 according to the embodiment of the present invention will be described using FIGS. 15A through 15N.

The processing illustrated in FIGS. 14A through 14M and FIGS. 15A through 15N is processing in use of the above-mentioned ADF.

FIGS. 14A through 14M illustrate processing in which originals of page sizes of A3 and A4 in a mixed manner are copied.

First, printing starts in response to the start key 236 being pressed by an operator. First printing is printing of five sheets of A4 paper of a single-sided original 310 shown in FIG. 14B. As shown in the figures, the original image is scanned, stored and printed out, and, after that, the same operation is repeated four times. Thereby, two A4 sheets of double-sided copy of pages 1 through 4 (copy 317) are produced as shown in FIG. 14I.

Next, an original image to print out subsequently is of the fifth A4 sheet. Original images to print out further subsequently include original images of A3 paper of the sixth sheet and so forth 312 shown in FIG. 14C. Therefore, the original images include different sizes in a mixed manner in this case. In this case, as the currently set printing type is for a double-sided copy, on the reverse side of the A4 printing paper sheet (see FIG. 14J) which has, on the observe side thereof, the fifth original image (page 5) has been printed as mentioned above, the sixth A3 original image (page 6) is printed. At this time, since the sixth original image has the size of A3 which is larger than the size A4 of the printing paper sheet of the fifth page, an incomplete copy (i.e., only a half of the original image is printed) is made as shown in FIG. 14J, unless the A3 original image is reduced into A4 before printing.

Then, double side copying for the seventh and eighth pages is performed. After that (starting from the ninth page), different paper sizes are mixed in an original again. This mixture is a mixture of varying an original from A3 to A4 (originals from 312 to 314) contrary to the above-mentioned case. At this time, the ninth page (of A3) of original image is first printed onto a printing paper. Then, although the tenth page of original image is of A4 (314), the tenth page of original image of A4 is printed on the reverse side of the printing paper A3 which has the ninth page of original image printed on the obverse side thereof as shown in FIG. 14L (copy 320). Therefore, although the original image is of A4, it may be expanded to A3 before being printed, or is printed as it is in A4 in the half of the A3 paper. After that, double side printing of A4 for the eleventh and twelfth pages is performed (FIG. 14M), and the printing processing is completed.

Thus, according to the related art described above, when double side printing in which different sizes of originals are mixed is performed, a problem may occur in that the size of the original image is changed unexpectedly or incomplete copying is made. The processing performed using the original separation key 234 according to the embodiment of the present invention for solving this problem will be described using FIGS. 15A through 15N.

First, a single-sided original 310 of five A4 paper sheets 310 (FIG. 15B) are set onto the ADF, and printing starts in response to the start key 236 being pressed. As shown in the figures, the original image is scanned, stored and printed. This series of operations are repeated four times, and, thereby, double side printing is carried out for the pages 1 through 4 for total two sheets of printing paper as shown in FIG. 15K.

Then, after the original image of the fifth sheet is stored in the storage, the original separation key 234 is pressed by the operator. By this, single side copy is performed for the original image of this fifth sheet. The single-sided original 310 is thus copied and printed into three sheets of printing papers 311 as shown in FIG. 15K by the above-described processing.

Next, an original 312 which includes of four original sheets of A3 size (see FIG. 15C) is set onto the ADF, and printing starts in response to the start key 236 being pressed. As shown in the figures, the original image is scanned, stored and printed. This series of operations are repeated four times, and, thereby, double side printing is carried out for the pages 6 through 9 for total two sheets of printing paper 313 as shown in FIG. 15L. The single-sided original 312 is thus copied and printed into two sheets of printing papers 312 as shown in FIG. 15L by the above-described processing. Then, the original separation key 234 is be again pressed by the operator.

Then, an original image 314 which includes of three original sheets of A4 size (FIG. 15D) is set onto the ADF, and printing starts in response to the start key 236 being pressed. Double side printing for these three A4 sheets 314 is performed in the following manner: The image is scanned, stored, and this series of operations is repeated thrice. The tenth and eleventh pages are printed in a double side printing manner, and, then, the twelfth page is printed out in a single side printing manner with the operator's pressing of the original separation key 234, as shown in FIG. 15E. The single-sided original 314 is thus copied and printed into two sheets of printing paper 315 as shown in FIG. 15M by the above-described processing. And after that, as shown in FIG. 15N (copy 329), it can is bound and thus grouped by staples.

Processing which includes a sorting operation in addition to the above-described processing will now be described with reference to FIGS. 16A through 16L. FIGS. 16A through 16L illustrate processing in which a sorting operation is performed after the end of processing such as that described above with reference to FIGS. 15A through 15N. Before sorting, the processing is same that of FIGS. 15A through 15N, and duplicated description thereof is omitted.

After the original separation key 234 is pressed in the end, the twelfth page is printed as shown in FIG. 16H. Then, in use of data of the original images once recorded in the storage, in a sorting operation 603 as shown in FIG. 16I, a required number of copies are produced, sorted and ejected from the fusion machine. In the case of FIGS. 16A through 16L, total three copies (each including pages 1 through 12) are produced.

By thus using the original separation key 234, it becomes possible to carry out double side copying of an original group including different sizes of paper sheets.

Next, other processing according to the embodiment of the present invention will be described, in which, in the above-described processing shown in FIGS. 15A through 15L, a change in original size is detected automatically, and, thereby, original separation is determined, with reference to FIGS. 17A through 17L.

First, a single-sided original 310 of five A4 sheets is set onto the ADF, and printing starts with an operator's pressing of the start key 236. As shown in figures, double side printing of these five A4 sheets is performed such that each page is scanned, stored and printed, and this series of operations is repeated four times. Thus, double side printing is performed for the A4 pages 1 through 4 of total two sheets, as shown in FIG. 17J.

Then, after the original image of the fifth sheet is stored in the storage, the operator sets onto the ADF an original 312 which includes four original images of A3 size each 312 shown in FIG. 17C.

Then, the sixth page of the thus-set original images 312 is read with the operator's pressing of the start key 236. Then, an automatic original separation detection 240 is made such that it is detected that the original thus changes in page size from A4 into A3 (from page 5 to pager 6) at this time, the fifth page of printed paper sheet is thus ejected from the fusion machine as shown in FIG. 17J with the reverse side thereof left unprinted. The single-sided original 310 is thus printed into three sheets of printing paper sheets 311 as shown in FIG. 17J by this processing. Double side printing of the above-mentioned original 312 of four A3 sheets is carried out from sixth through ninth pages for total two sheets of same A3 (313 of FIG. 17K). Then, an original 314 of three A4 sheets shown in FIG. 17D is set by the operator onto the ADF.

And printing of the original 314 is started with the operator's pressing of the start key 236. Thereby, the tenth and eleventh pages of the original 314 are printed. After the twelfth page of the original 314 is scanned, an original separation detection is made again automatically so that it is detected automatically that there is no other original on the ADF. Then, the twelfth page of the original 314 is printed and ejected with a printing paper sheet having the reverse side thereof left unprinted. Such a original size detection and a detection of no original on the ADF are achievable by a certain function of general ADF (automatic draft feeder), which will be described later with reference to FIGS. 22-31.

Thus, instead of using the original separation key 234, the paper size of original may be automatically detected, and, thereby, proper copying/printing is achieved even for an original which includes different sizes of paper sheets automatically.

Processing which includes a sorting operation in addition to the above-described processing will now be described with reference to FIGS. 18A through 18L. FIGS. 18A through 18L illustrate processing in which a sorting operation is performed after the end of processing such as that described above with reference to FIGS. 17A through 17L. Before sorting, the processing is same as that of FIGS. 17A through 17L, and duplicated description thereof is omitted.

After the original separation detection 249 is made at the end, the twelfth page is printed as mentioned above. Then, in use of data of the original once recorded in the storage, as shown in FIG. 18I, in a sorting operation 604, a required number of copies are sorted and ejected from the fusion machine. In the case of FIGS. 18A through 18L, total three copies (each including pages 1 through 12) are produced.

Thus, instead of using the original separation key 234, the paper size of original may be automatically detected, and, thereby, proper copying/printing is achieved even for an original which includes different sizes of paper sheets, automatically.

Next, extension of an original image at a time of using the ADF in the embodiment of the present invention will be described using FIGS. 19A through 19N. FIGS. 19A through 19N illustrate a processing in which, subsequent to an original 324 shown in FIG. 19B, an original 325 shown in FIG. 19C is additionally placed on the ADF. First, the original 322 shown in FIG. 19A is printed in a manner similar to that described above, and a copy 323 is produced as shown in FIG. 19L. After that, the original separation key 234 is pressed by the operator and the original 324 (pages 5 and 6) is copied.

Then, as the operator wishes to include the original 325 (pages 7 and 8) at this time, the operator puts the original 325 onto the ADF without pressing the original separation key 234. Then, when the operator presses the start key 236, the original 325 is copied, and thus, a copy 326 of a combination of the originals 324 and 325 is obtained (pages 5 through 8) as shown in FIG. 19M.

After that, in case another original 327 of single-sided paper sheets shown in FIG. 19D is copied, first, the operator presses the original reading mode change key 191, and press the original separation key 234. Then, the operator sets the original image 327 onto the ADF, and then presses the start key 326. Thereby, a copy 328 shown in FIG. 19N is obtained. Thus, when adding an original, it can be achieved in a manner same as usual.

In case of performing sorting in the above-described case, as shown in FIGS. 20A through 20P, in response to the end key 237 being pressed as shown in FIG. 20E, in use of data of the original once recorded in the storage, with a sorting operation 605, a required number of copies are produced, sorted and ejected from the fusion machine. In the case of FIGS. 20A through 20P, total three copies (each including pages 1 through 10) are produced.

Figure 21:
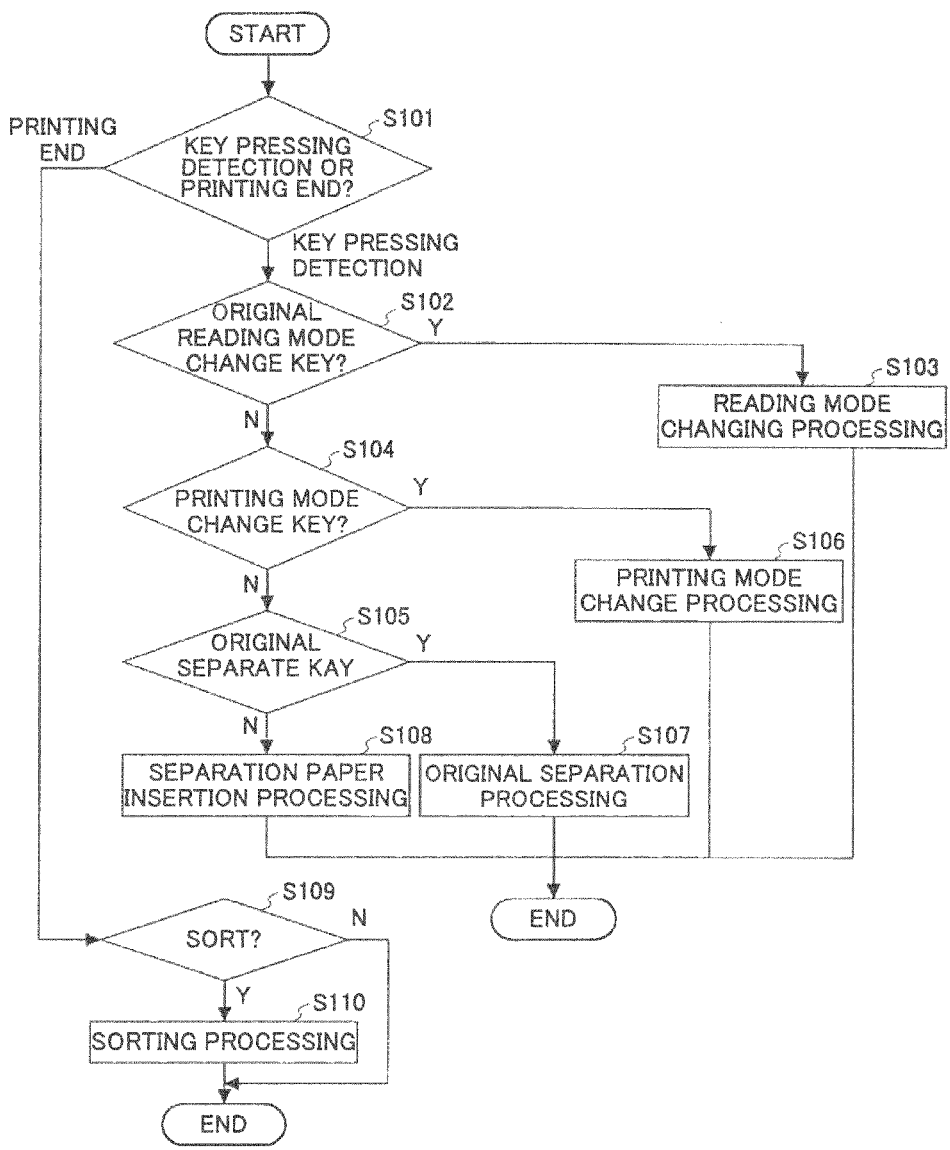
FIG. 21 shows an operation flow chart which shows processing in a case where a key is pressed, and a case of printing finish.

With reference to FIG. 21, printing of original including different size in a mixed manner and sorting described above will be described again. This flow chart illustrates a part of various processing performed by the fusion machine in the embodiment of the present invention described above.

First, a determination is made whether an operator's pressing of a certain key is detected or the current printing operation is finished, in Step S101. The certain key to be pressed in this flow chart is assumed to be any one of the above-mentioned original reading mode change key 191, printing mode change key 192, original separation key 193, and insert separation paper key 232.

In case the pressing of the certain key is detected, it is determined in Step S102 as a reading type change step, whether the original reading mode change key has been pressed. In the case of the original reading mode change key being pressed, in Step S103, reading mode change processing is performed accordingly and the processing is completed.

It is then determined in Step S104 as a printing type change step, whether the printing mode change key has been pressed. In the case of the printing mode change key being pressed, in Step S106, printing mode change processing is thus performed and the processing is completed.

It is then determined in Step S105 as an original separation step, whether the original separation key has been pressed. In the case of the original separation key being pressed, in Step S107, original separation processing is thus performed and the processing is completed.

In Step S108 as a paper insertion step, it can be determined that any one of the above-mentioned three keys has not been pressed, and, thus, it can be determined that the remaining insert separation paper key has been pressed. Then, separation paper insertion processing is performed, and the processing is completed.

In Step S101, when it is determined the printing is finished, it is determined in Step S109 as a sorting step, whether sorting should be performed or not. When sorting should be performed, in Step S110, sorting processing is performed and the processing is completed.

A method of accelerating printing processing will now be described. In processing using the ADF described with reference to FIGS. 19A through 19N, as the original reading mode change key 191 is used without applying the automatic original size detection/determination, it is possible to accelerate the printing processing. This is because a certain time is required for the automatic original size determination. The method of the ADF's detecting the size of an original will now be described.

Figure 22:
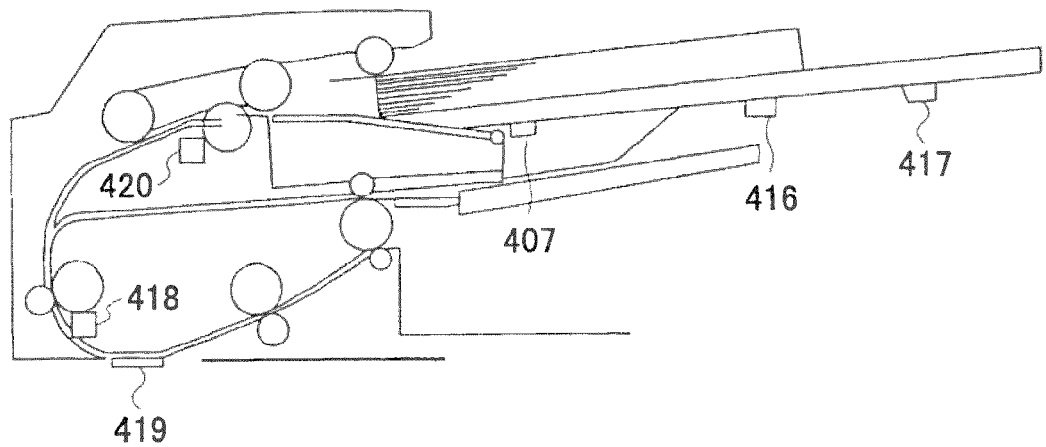
FIG. 22 shows a sectional view of an ADF.

FIG. 22 is a sectional view of the ADF 400 included in the engine part 110 of the fusion machine described above. The ADF 400 has an original width size sensor 420, an original set sensor 407, original length detection sensors 416 and 417, and a registration sensor 418, as shown in FIG. 22. An original image is read at an original reading position 419.

The original width size sensor 420 includes three sensors, and detects the width of the original loaded there. The original set sensor 407 detects whether the original is set or not. The original length detection sensors 416 and 417 detect the length of the original loaded. The registration sensor 418 is a sensor which detects whether the original locates in the position of the registration sensor 418.

Figure 23:
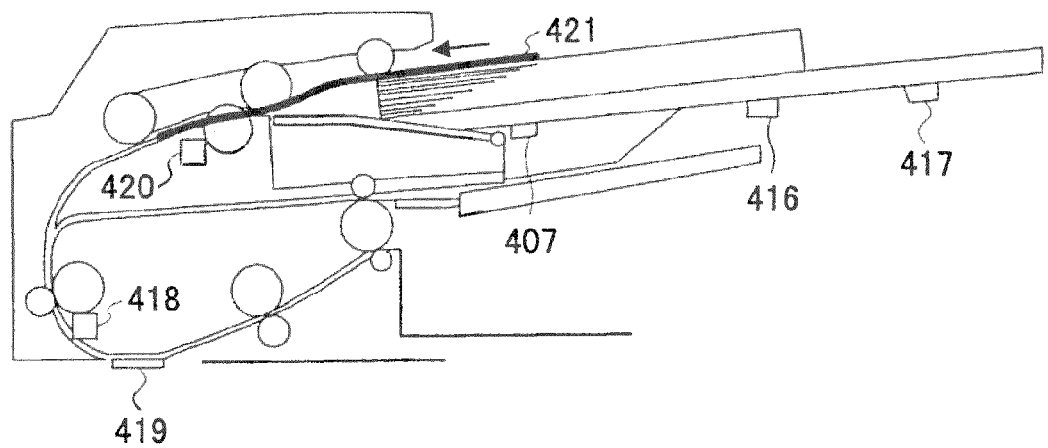
FIGS. 23 through 31 illustrate a motion of paper in the ADF.

A motion of paper in the ADF 400 in case an original does not include different sizes of paper sheets will now be described. First, when paper of an original 421 is fed to the ADF 400 as shown in FIG. 23, the ADF 400 determines the size of the paper of original 421 from the information from the original length detection sensors 416 and 417 and the information from the original width size sensor 420 as the original being fed.

Figure 24:
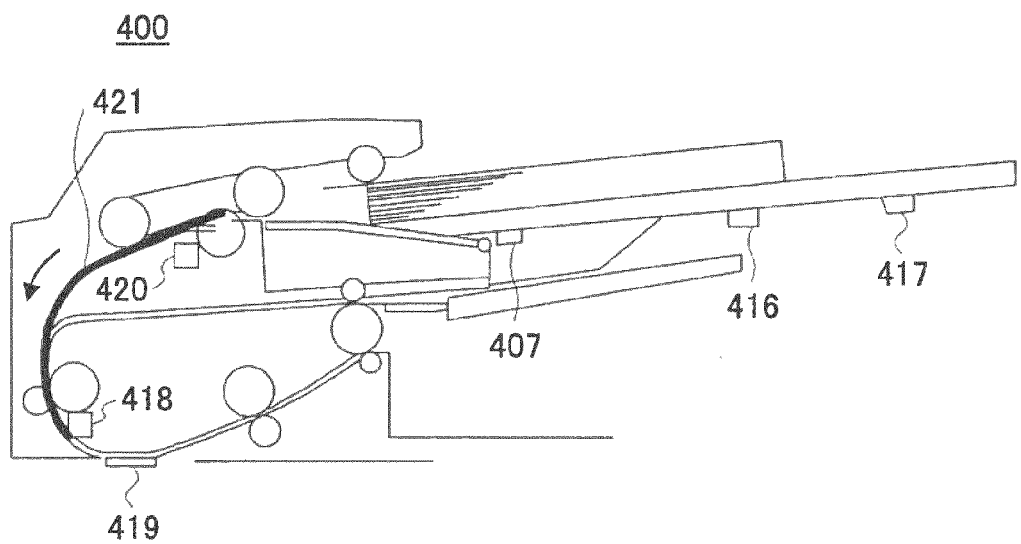
Figure 25:
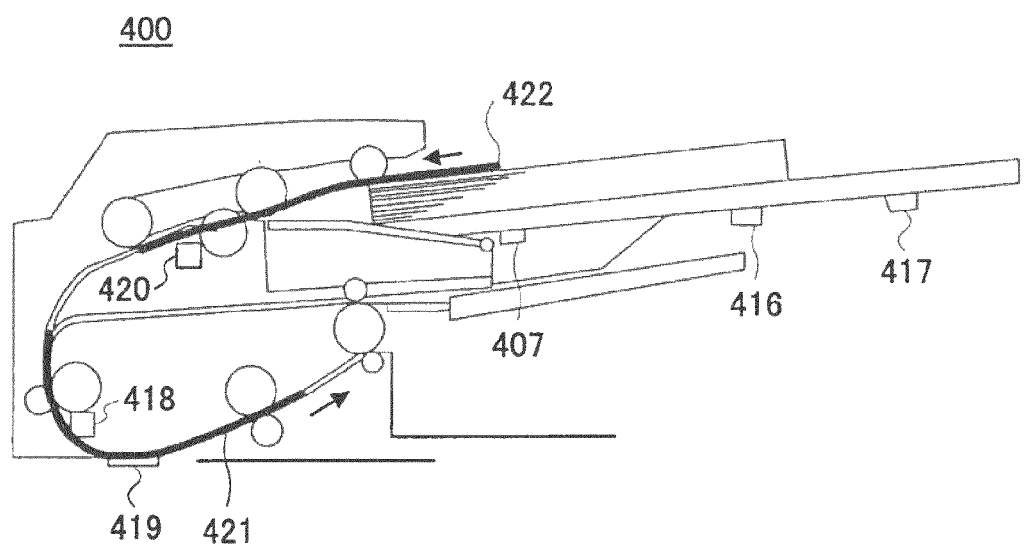
Figure 26:
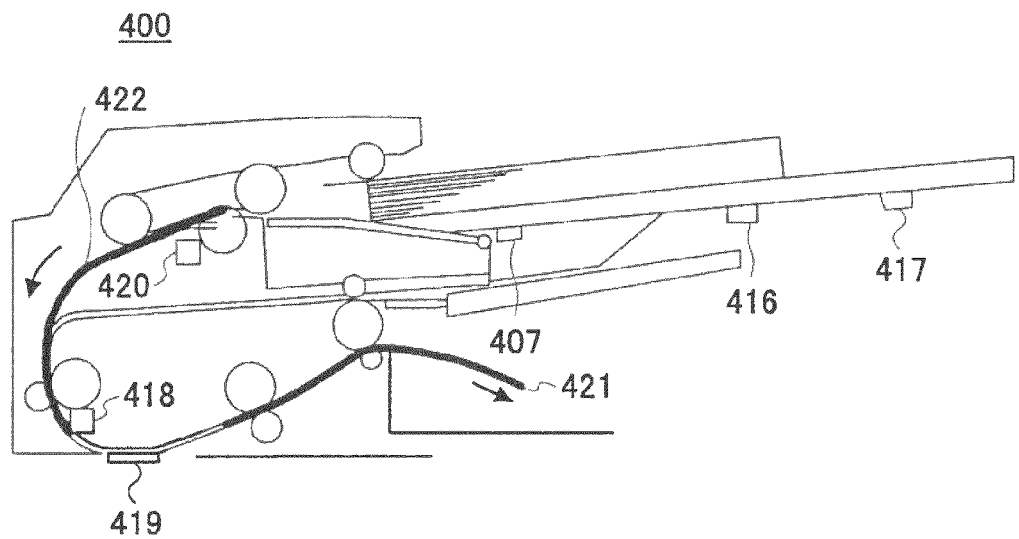

And, as shown in FIG. 24, the original 421 is drawn forward, and has passed by the original width size sensor 420 as shown in FIG. 25. When another original is detected by the original set sensor 407 at this time, another paper of the original 422 is fed. And as shown in FIG. 26, the paper of the first original 421 is ejected from the ADF 400. The image of the original 421 is read/scanned when it passes by the original reading position 419 as shown in FIG. 25 to be then printed out in a copying/printing operation in the machine.

Figure 27:
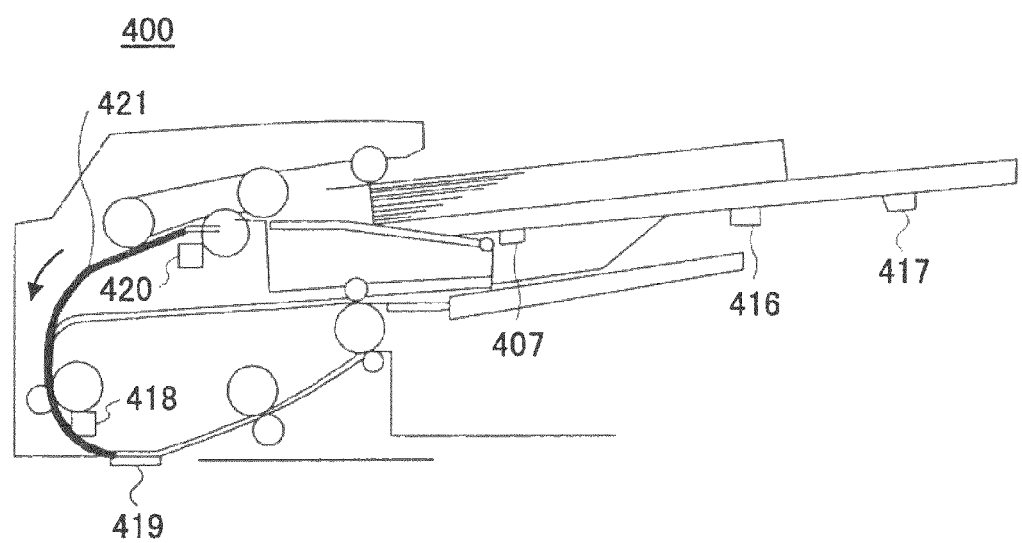
Figure 28:
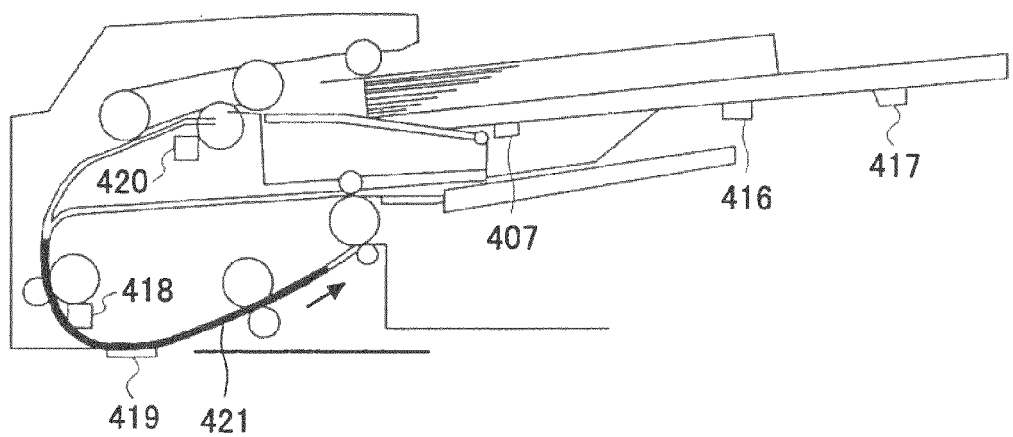
Figure 29:
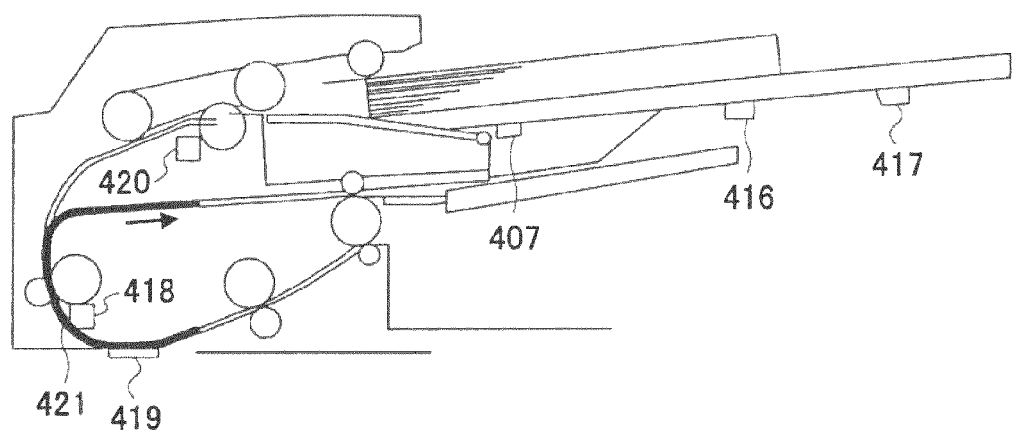

A motion of paper in case an original includes various sizes of paper sheets will now be described. In this case, different from the above-mentioned case, the ADF 400 determines the size of an original paper sheet only from the information of the original width size sensor 420. Therefore, the ADF 400 cannot detect the size of the original until the original paper sheet 421 has passed by the original width size sensor 420 as shown in FIG. 27. The ADF 400 drives forward the original 421 for which the size has been thus detected, to a position at which the paper is almost being ejected, as shown in FIG. 28. Then, as shown in FIGS. 29 and 30, the ADF 400 drives the original 421 backward so that the front edge of the original 421 reaches the original reading position 419.

Figure 30:
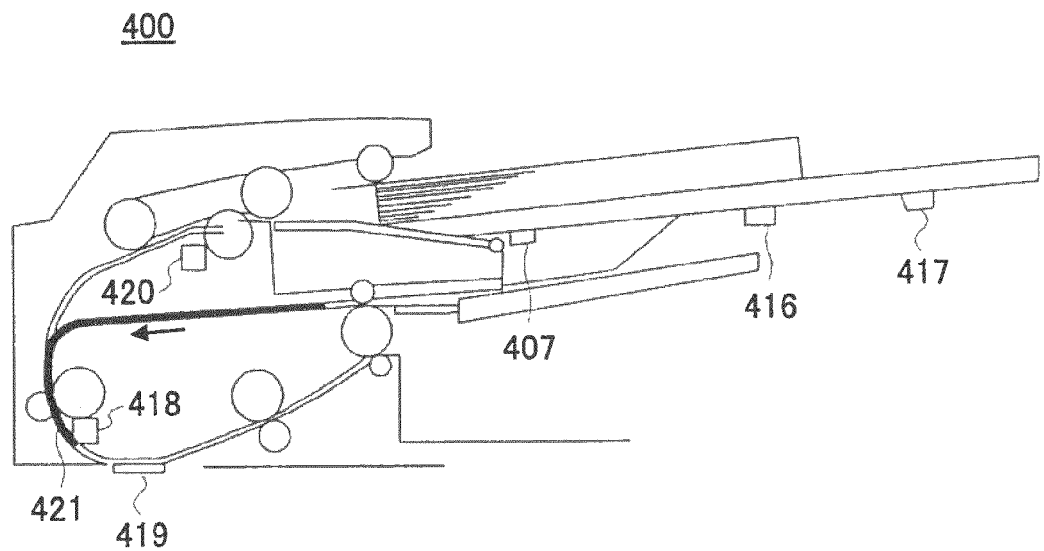
Figure 31:
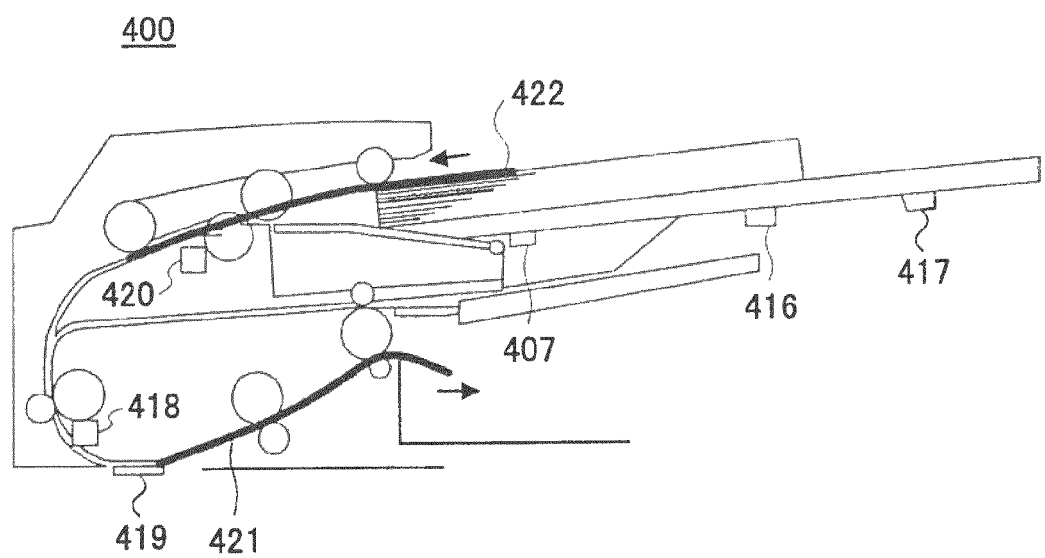

And as shown in FIG. 30, when the rear edge of the original 421 which has been driven backward as mentioned above has passed by the registration sensor 418, and, also, another original is detected by the original set sensor 407, as shown in FIG. 30, the ADF 400 then feeds paper of the other original 422, as shown in FIG. 31.

Thus, when the size of an original is not determined by an operation of an operator, the original should be driven backward as mentioned above before another original is fed. Accordingly, an extra time is required. In this view, it can be said that it is possible to accelerate the printing processing by rather using the original reading mode change key 191 by which information of the size of the original is given externally by an operator previously.

Further, the present invention is not limited to the above-described embodiment, and variations and modifications may be made without departing from the basic concept of the present invention.

What is claimed is:

1. An image forming apparatus comprising:
    a hardware resource used for image forming processing; and
    a program for performing processing concerning image formation,
    wherein said apparatus comprises:
    a printing type changing part changing a type in which a read image of an original is formed on a printing paper sheet, during a plurality of originals which include different types of originals in a mixed manner being read,
    wherein said printing type changing part changes a type in which a read image of an original is formed on a printing paper sheet in response to an instruction input by an operator after a first of the plurality of originals is read and before a last of the plurality of originals is read.

2. The image forming apparatus as claimed in claim 1, further comprising a grouping part configured to group the printing paper sheets on which images have been formed based on the plurality of originals.

3. The image forming apparatus as claimed in claim 1, wherein:
    in case the printing type changing part changes the type in which an image of original is formed on a printing paper sheet, an image of original formed subsequently on a printing paper sheet which is different from a printing paper sheet on which an image is formed immediately before the type of forming an image is changed.

4. The image forming apparatus as claimed in claim 1, wherein:
    said type comprises a size of the original.

5. The image forming apparatus as claimed in claim 4, further comprising a size detecting part detecting the size of the original.

6. The image forming apparatus as claimed in claim 5, wherein:
    said printing type changing part changes the size of a printing paper sheet on which an image of original is formed subsequently when the size of an original detected by said size detecting part immediately before is different from the size of an original which is read subsequently.

7. The image forming apparatus as claimed in claim 5, wherein:

said size detecting part stops an original size detecting operation in response to a reading type change instruction input by an operator.

8. The image forming apparatus as claimed in claim 1, further comprising an automatic original feeding part which automatically reads the plurality of originals set therein.

9. The image forming apparatus as claimed in claim 1, wherein:

in addition to the image of original, a page number is printed on the printing paper sheet.

10. The image forming apparatus as claimed in claim 9, wherein:

the page number is not printed on a side of the printing paper sheet on which the image of original is not formed.

11. The image forming apparatus as claimed in claim 1, further comprising a recording part which stores data of each image which is formed on the printing paper sheet.

12. The image forming apparatus as claimed in claim 11, wherein:

the data stored by said recording part are integrated.

13. The image forming apparatus as claimed in claim 2, wherein:

said grouping part groups the plurality of printing paper sheets by attaching a front cover or a back cover to said plurality of printing paper sheets.

14. The image forming apparatus as claimed in claim 2, wherein:

said grouping part groups the plurality of printing paper sheets by binding them with a staple or punching them.

15. The image forming apparatus as claimed in claim 2, wherein:

said grouping part groups the plurality of printing paper sheets in response to a finish instruction input by an operator.

16. The image forming apparatus as claimed in claim 1, further comprising a sorting part which sorts and ejects the plurality of printing paper sheets on which images of the plurality of originals are formed.

17. The image forming apparatus as claimed in claim 16, wherein:

said sorting part sorts and ejects the plurality of printing paper sheets in use of the data of images of originals.

18. The image forming apparatus as claimed in claim 17, wherein:

said sorting part ejects the plurality of printing paper sheets with changing an orientation or shifting a position thereof.

19. The image forming apparatus as claimed in claim 16, wherein:

said sorting part sorts and ejects the plurality of printing paper sheets in response to a finish instruction input by an operator.

\* \* \* \* \*